(12) United States Patent
Matsuo

(10) Patent No.: US 11,388,331 B2
(45) Date of Patent: Jul. 12, 2022

(54) IMAGE CAPTURE APPARATUS AND CONTROL METHOD THEREOF

(71) Applicant: CANON KABUSHIKI KAISHA, Tokyo (JP)

(72) Inventor: Yasuhiro Matsuo, Gyoda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/991,547

(22) Filed: Aug. 12, 2020

(65) Prior Publication Data

US 2021/0051266 A1 Feb. 18, 2021

(30) Foreign Application Priority Data

Aug. 14, 2019 (JP) .............................. JP2019-148926

(51) Int. Cl.
*H04N 5/232* (2006.01)
*G06F 3/01* (2006.01)
*H04N 5/235* (2006.01)

(52) U.S. Cl.
CPC ......... *H04N 5/23219* (2013.01); *G06F 3/013* (2013.01); *H04N 5/2353* (2013.01); *H04N 5/23222* (2013.01)

(58) Field of Classification Search
CPC ............ H04N 5/23219; H04N 5/2353; H04N 5/23222; G06F 3/013
See application file for complete search history.

(56) References Cited

U.S. PATENT DOCUMENTS 9,508,004 B2 * 11/2016 Mohanakrishnan ... A61B 3/113
2015/0022682 A1 * 1/2015 Seita .................. H04N 5/23218
348/220.1

FOREIGN PATENT DOCUMENTS

JP   2005-249831 A   9/2005
JP   2014-182360 A   9/2014

* cited by examiner

*Primary Examiner* — Ahmed A Berhan
(74) *Attorney, Agent, or Firm* — Cowan, Liebowitz & Latman, P.C.

(57) ABSTRACT

An image capture apparatus that detects a position of a gazed point in an image based on a line of sight of a user is disclosed. The image capture apparatus also detects at least one characteristic area from the image and sets a determination area to each characteristic area having a size that is greater than or equal to a predetermined lower limit value. Then the image capture apparatus selects the characteristic area corresponding to a determination area including the position of the gazed point.

20 Claims, 15 Drawing Sheets

| FRAME NUMBER | GAZED AREA | GAZE TIME OF 353 | GAZE TIME OF 363 | GAZE TIME OF 373 | MAIN SUBJECT |
|---|---|---|---|---|---|
| 1 | 353 | 1 | 0 | 0 | NO |
| 2 | 353 | 2 | 0 | 0 | NO |
| 3 | 373 | 2 | 0 | 1 | NO |
| 4 | 363 | 2 | 1 | 1 | NO |
| 5 | 353 | 3 | 1 | 1 | 351 |
| 6 | 353 | 1 | 0 | 0 | 351 |

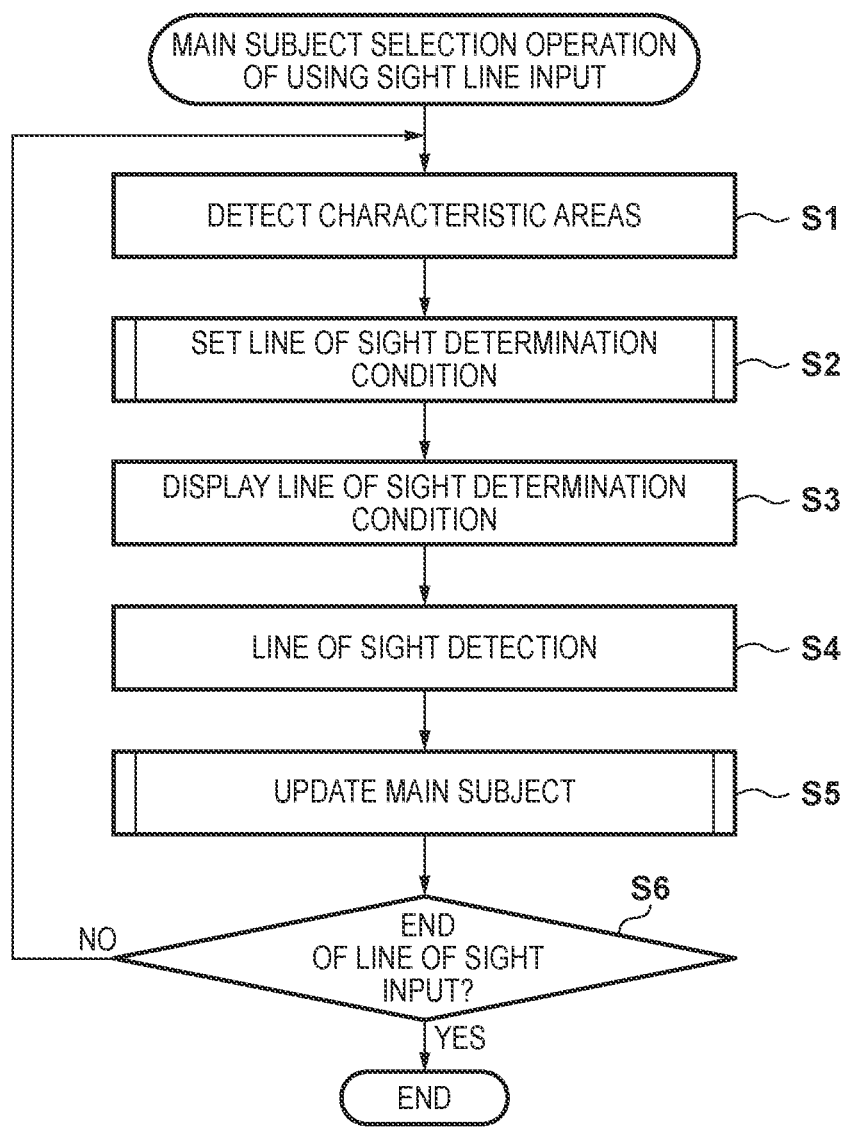

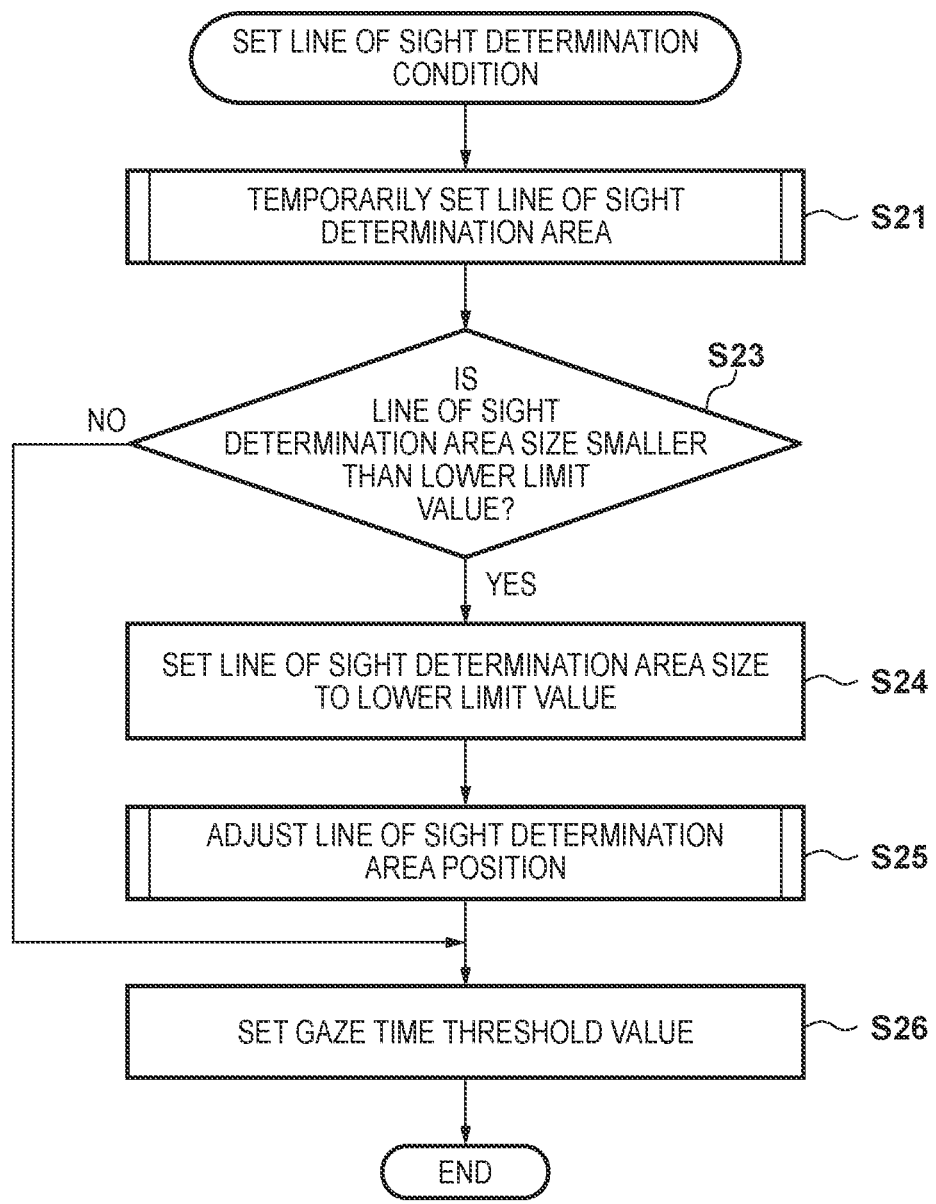

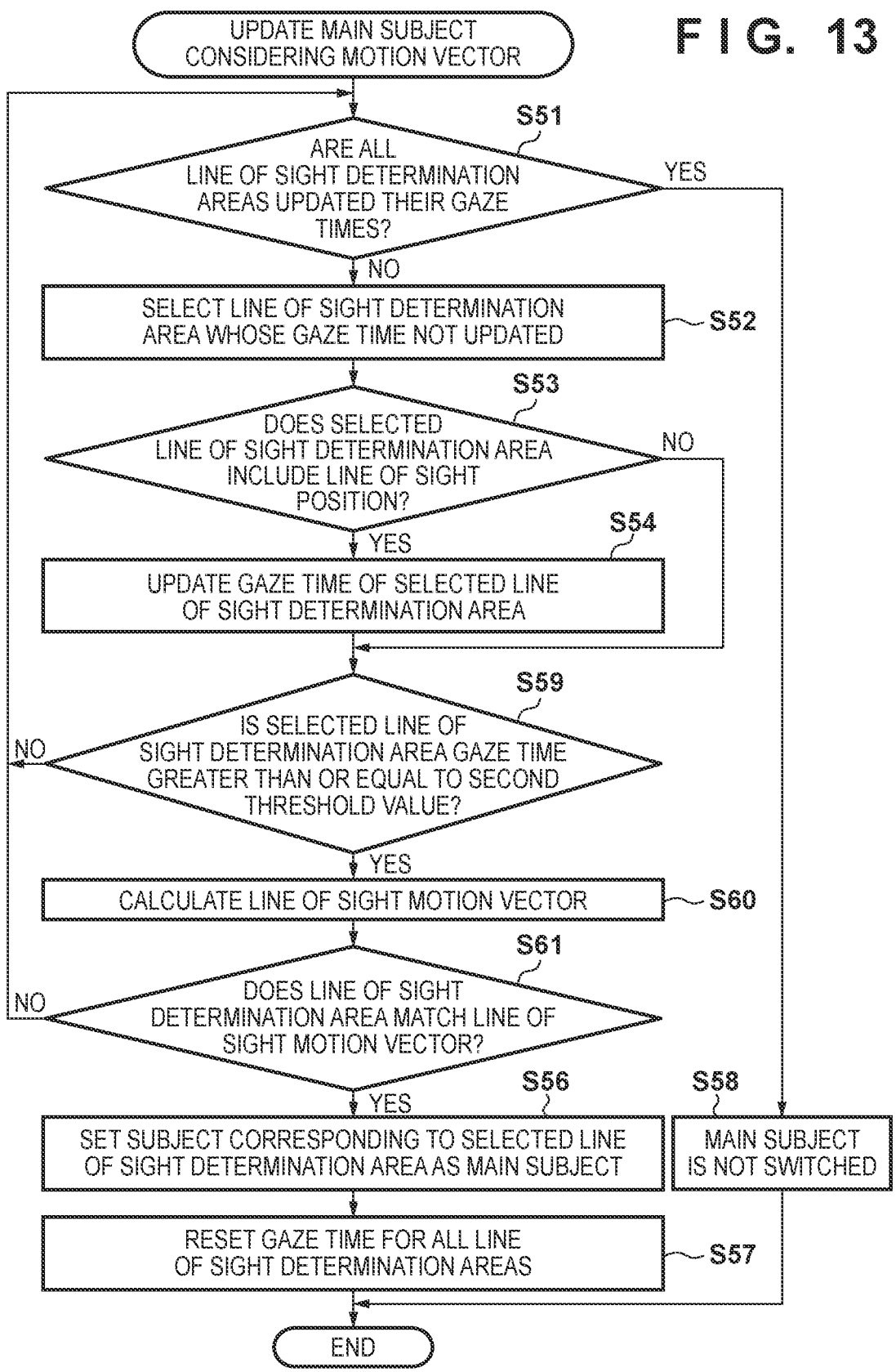

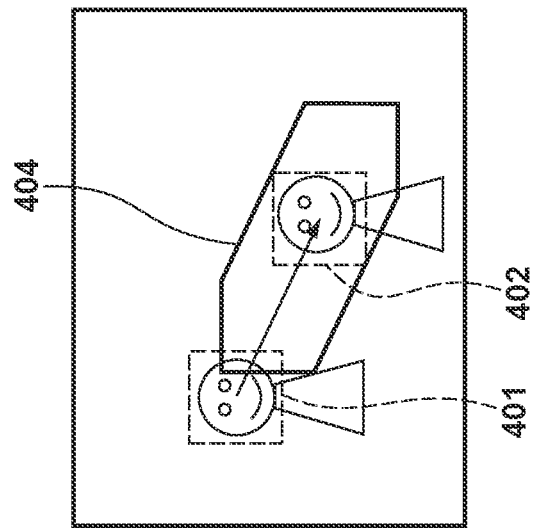
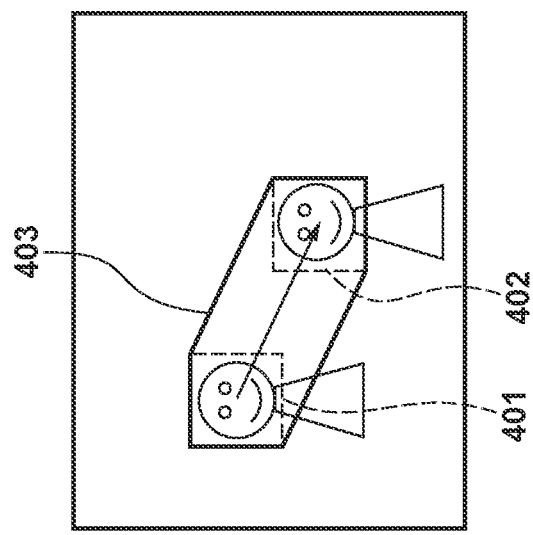

IMAGE CAPTURE APPARATUS AND CONTROL METHOD THEREOF

BACKGROUND OF THE INVENTION

Field of the Invention

The present invention relates to an image capture apparatus and a control method thereof, and specifically relates to a technique for assisting the selection of a subject to be focused on.

Description of the Related Art

An image capture apparatus that allows a user to select one of a plurality of candidate areas having the same size and fixed positions using his/her a line of sight (Japanese Patent Laid-Open No. 2005-249831). In such an image capture apparatus, a candidate area corresponding to a determination area that includes coordinates of a gazed point in an image, which can be obtained based on a direction of a line-of-sight of the user, from among a plurality of determination areas that are respectively set in advance for candidate areas, can be regarded as the focus detection area selected by a user.

For example, if trying to realize a configuration in which one of a plurality of image areas that differ in size and position can be selected using a line of sight, it would be required dynamically setting the determination areas. However, there has been no such technique.

SUMMARY OF THE INVENTION

The present invention in its an aspect provides an image capture apparatus in which determination areas can be appropriately set such that one of a plurality of image areas that differ in size and position can be selected using a line of sight, and a control method thereof.

According to an aspect of the present invention, there is provided an image capture apparatus comprising: a line of sight detection circuit that detects a position of a gazed point in an image based on a line of sight of a user; an area detection circuit that detects at least one characteristic area from the image; a setting circuit that sets a determination area to each characteristic area; and a selection circuit that selects the characteristic area corresponding to a determination area including the position of the gazed point, wherein: the setting circuit sets the determination area having a size that is greater than or equal to a predetermined lower limit value.

According to an aspect of the present invention, there is provided a control method of an image capture apparatus comprising: detecting a position of a gazed point in an image based on a line of sight of a user; detecting at least one characteristic area from the image; setting a determination area to each characteristic area; and selecting the characteristic area corresponding to a determination area including the position of the gazed point, wherein, in the setting, the determination area having a size that is greater than or equal to a predetermined lower limit value is set.

According to an aspect of the present invention, there is provided a non-transitory computer-readable medium storing a program for causing at least one processor included in an image capture apparatus to function as: a line of sight detection unit configured to detect a position of a gazed point in an image based on a line of sight of a user; an area detection unit configured to detect at least one characteristic area from the image; a setting unit configured to set a determination area to each characteristic area; and a selection unit configured to select the characteristic area corresponding to a determination area including the position of the gazed point, wherein: the setting unit sets the determination area having a size that is greater than or equal to a predetermined lower limit value.

Further features of the present invention will become apparent from the following description of exemplary embodiments (with reference to the attached drawings).

BRIEF DESCRIPTION OF THE DRAWINGS

FIG. 6 is a flowchart relating to a selection operation of a main subject according to the first embodiment.

FIG. 7 is a flowchart relating to setting of a line of sight determination condition according to the first embodiment.

FIG. 13 is a flowchart relating to an updating operation of a main subject according to the fourth embodiment.

FIGS. 14A and 14B are diagrams illustrating an example of determination areas according to the fourth embodiment.

DESCRIPTION OF THE EMBODIMENTS

Figure 1:
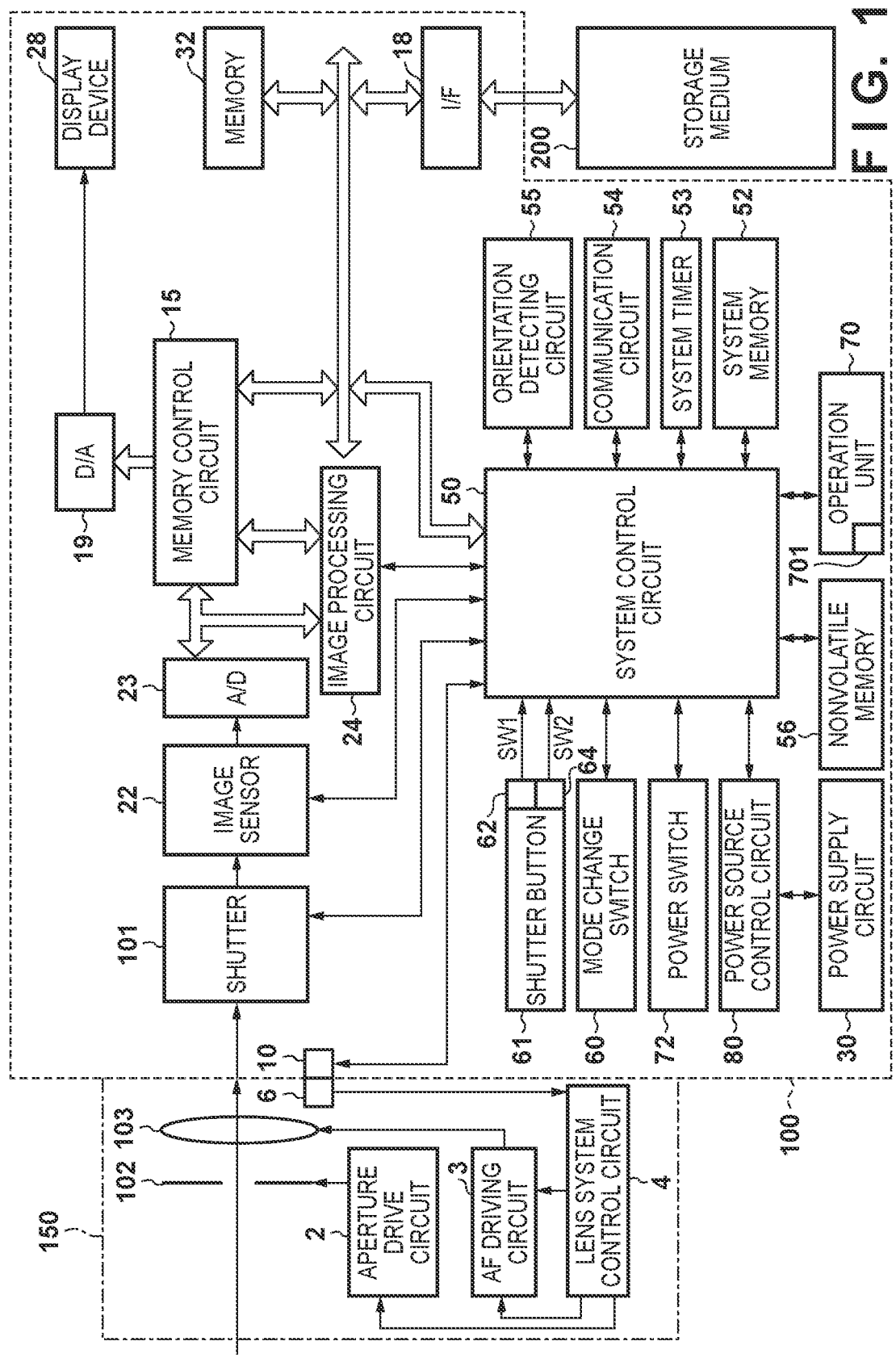
FIG. 1 is a block diagram illustrating an exemplary functional configuration of an image capture apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

Note that, in the following embodiments, a case where the present invention is implemented in an interchangeable lens type digital camera will be described. However, the present invention can be applied to any electronic device in which a line of sight detection function and an image capture function can be installed. Such electronic devices include a video camera, a computer device (such as a personal computer, a tablet computer, a media player, or a PDA), a mobile phone, a smart phone, a game machine, a robot, a drone, a drive recorder, and the like. However, these are merely examples, and the present invention can also be applied to other electronic devices. Also, the present invention can also be applied to a configuration in which the line of sight detection function and the image capture function are respectively installed on separate devices (e.g., a main body and a remote controller) that can communicate to each other.

First Embodiment

FIG. 1 is a block diagram illustrating an exemplary functional configuration of a digital camera system serving as an example of an image capture apparatus according to an embodiment of the present invention. The digital camera system includes a main body 100 of an interchangeable lens type digital camera and a lens unit 150 that can be attached to and detached from the main body 100. Note that being an interchangeable lens type is not essential to the present invention.

The lens unit 150 includes a communication terminal 6 that is brought into contact with a communication terminal 10 provided in the main body 100 when the lens unit 150 is attached to the main body 100. Power is supplied from the main body 100 to the lens unit 150 through the communication terminals 10 and 6. Also, a lens system control circuit 4 and a system control circuit 50 of the main body 100 can bidirectionally communicate through the communication terminals 10 and 6.

In the lens unit 150, a lens group 103 is an imaging optical system constituted by a plurality of lenses including a movable lens. The movable lens includes at least a focus lens. Also, the movable lens may further include at least one of a variable magnification lens and a blur correction lens depending on the lens unit 150. An AF drive circuit 3 includes a motor, an actuator, and the like for driving the focus lens. The focus lens is driven by the lens system control circuit 4 controlling the AF drive circuit 3. An aperture drive circuit 2 includes a motor actuator and the like for driving an aperture 102. The aperture diameter of the aperture 2 is adjusted by the lens system control circuit 4 controlling the aperture drive circuit 2.

A mechanical shutter 101 is driven by the system control circuit 50, and adjusts the exposure time of an image sensor 22. Note that the mechanical shutter 101 is kept in a fully opened state when a moving image is captured.

An image sensor 22 is a CCD image sensor or a CMOS image sensor, for example. A plurality of pixels are arranged two-dimensionally in the image sensor 22, and each pixel is provided with one micro lens, one color filter, and at least one photoelectric conversion region. In the present embodiment, each pixel is provided with a plurality of photoelectric conversion regions, and is configured such that a signal can be read out from each photoelectric conversion region. As a result of the pixel being configured in this way, a captured image, a parallax image pair, and image signals for phase difference AF can be generated from signals read out from the image sensor 22.

An A/D converter 23 is used to convert an analog image signal output from the image sensor 22 to a digital image signal (image data). Note that the A/D converter 23 may be included in the image sensor 22.

Figure 2A:
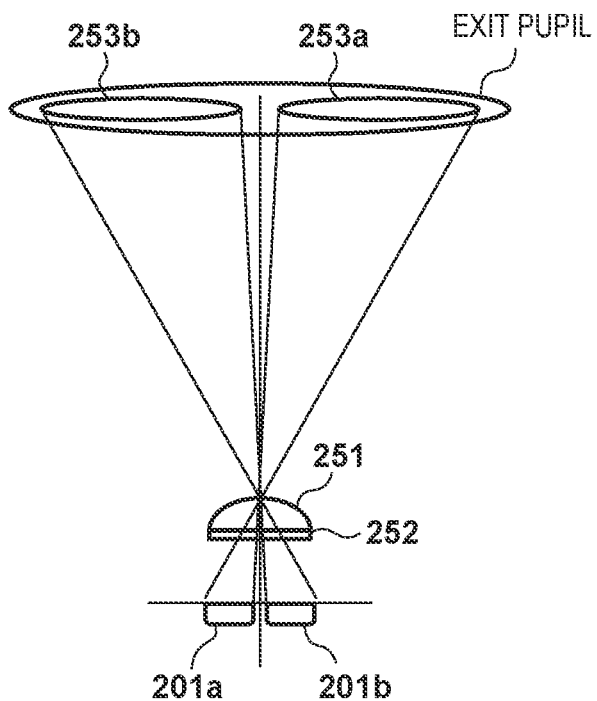
FIGS. 2A and 2B are diagrams illustrating an example of a correspondence relationship between an exit pupil and a photoelectric conversion region, of the image capture apparatus according to the embodiment.

FIG. 2A is a diagram schematically illustrating a correspondence relationship between an exit pupil of the lens unit 150 and photoelectric conversion regions, when a pixel included in the image sensor 22 has two photoelectric conversion regions.

Two photoelectric conversion regions 201a and 201b provided in a pixel share one color filter 252 and one micro lens 251. Also, light that has passed through a partial region 253a of the exit pupil enters the photoelectric conversion region 201a, and light that has passed through a partial region 253b of the exit pupil enters the photoelectric conversion region 201b.

Therefore, with respect to pixels included in certain pixel region, an image formed by signals read out from the photoelectric conversion regions 201a and an image formed by signals read out from the photoelectric conversion regions 201b form a parallax image pair. Also, the parallax image pair can be used as image signals (A image signal and B image signal) for phase difference AF. Moreover, as a result of adding the signals read out from the photoelectric conversion regions 201a and 201b for each pixel, a normal image signal (captured image) can be obtained.

Figure 2B:
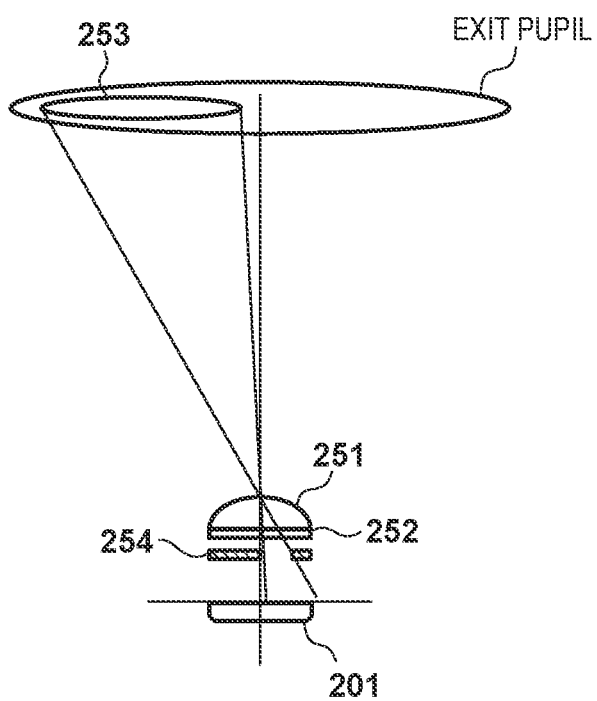

Note that, in the present embodiment, each pixel of the image sensor 22 functions as a pixel (focus detection pixel) for generating signals for phase difference AF and a pixel (imaging pixel) for generating a normal image signal. However, a configuration may also be adopted in which some pixels of the image sensor 22 are dedicated focus detection pixels and other pixels are imaging pixels. FIG. 2B shows an exemplary configuration of a dedicated focus detection pixel and a region 253 of an exit pupil through which incident light passes. The focus detection pixel configured as shown in FIG. 2B functions similarly to the photoelectric conversion region 201b in FIG. 2A. In actuality, as a result of arranging the focus detection pixels configured as shown in FIG. 2B and focus detection pixels of another type that function similarly to the photoelectric conversion region 201a in FIG. 2A over the entirety of the image sensor 22 in an distributed manner, a focus detection area of any size can be substantially set at any location.

FIGS. 2A and 2B show a configuration in which an image sensor for obtaining a recording image is used as a sensor for phase difference AF, but the present invention does not depend on the AF method as long as a focus detection area that changes in size and position can be used. For example, the present invention can be implemented even in a configuration in which contrast AF is used. When only the contrast AF is used, one photoelectric conversion region is included in each pixel.

Returning to FIG. 1, the image data (RAW image data) output from the A/D converter 23 is, after being processed by the image processing circuit 24 as needed, stored in the memory 32 via the memory control circuit 15. The memory 32 is used as a buffer memory for temporarily storing image data and sound data, and is used as a video memory for a display device 28.

The image processing circuit 24 applies predetermined image processing on image data, and generates a signal and image data, and acquires and/or generates various types of information. The image processing circuit 24 may be a dedicated hardware circuit such as an ASIC designed for realizing a specific function, or may be configured such that a specific function is realized by a processor such as a DSP executing software.

Here, the image processing applied by the image processing circuit 24 includes preprocessing, color interpolation processing, correction processing, detection processing, data processing, evaluation value calculation processing, and the like. The preprocessing includes signal amplification, reference level adjustment, defect pixel correction, and the like. The color interpolation processing is processing for interpolating color component values that are not included in image data, and is also referred to as demosaic processing. The correction processing includes white balance adjustment, processing for correcting luminances of an image, processing for correcting the optical aberration of the lens unit 150, processing for correcting colors, and the like. The detection processing includes processing for detecting and tracking a characteristic area (e.g., face area or human body area), processing for recognizing people, and the like. The data processing includes scaling processing, encoding and decoding processing, header information generation processing, and the like. The evaluation value calculation processing includes processing for calculating evaluation values of a pair of image signals for phase difference AF, or for contrast AF, evaluation values used for automatic exposure control, and the like. Note that these are merely examples of image processing that can be performed by the image processing circuit 24, and the image processing that can be performed by the image processing circuit 24 is not limited thereto. Also, the evaluation value calculation processing may be performed by the system control circuit 50.

A D/A converter 19 generates an analog signal suitable for display in the display device 28 from display image data stored in the memory 32, and supplies the analog signal to the display device 28. The display device 28 includes a liquid-crystal display panel, for example, and performs display based on the analog signal from the D/A converter 19.

As a result of successively performing shooting of a moving image and displaying the captured moving image, the display device 28 can be functioned as an electrical viewfinder (EVF). The moving image displayed in order for the display device 28 to function as EVF is referred to as a live view image. The display device 28 may be provided inside of the main body 100 so as to be observed through an eyepiece unit, or may be provided on a casing surface of the main body 100 so as to be observable without using the eyepiece unit. The display device 28 may also be provided both inside of the main body 100 and on the casing surface.

The system control circuit 50 is a CPU (may also be referred to as an MPU or a microprocessor), for example. The system control circuit 50 controls the operations of the main body 100 and the lens unit 150 by loading a program stored in a nonvolatile memory 56 to a system memory 52 and executing the program, and realizes the functions of the camera system. The system control circuit 50 controls the operations of the lens unit 150 by transmitting various commands to the lens system control circuit 4 by the communication through the communication terminals 10 and 6.

The nonvolatile memory 56 may be rewritable. The nonvolatile memory 56 stores a program to be executed by the system control circuit 50, various setting values of the camera system, image data for GUI (Graphical User Interface), and the like. The system memory 52 is a main memory used when the system control circuit 50 executes a program.

The system control circuit 50, as some of its operations, performs automatic exposure control (AE) processing based on an evaluation value generated by the image processing circuit 24 or by oneself, and determines the shooting conditions. The shooting conditions include, in a case of still image shooting, shutter speed, f-number, and ISO speed. The system control circuit 50 determines at least one of shutter speed, f-number, and ISO speed according to the set AE mode. The system control circuit 50 controls the f-number (aperture diameter) of the aperture mechanism of the lens unit 150. Also, the system control circuit 50 also controls the operations of the mechanical shutter 101.

Also, the system control circuit 50 performs automatic focus detection (AF) processing for causing the lens group 103 to focus on a subject inside a focus detection area by driving a focus lens of the lens unit 150 based on an evaluation value generated by the image processing circuit 24 or by oneself, or the defocus amount.

The system timer 53 is an internal clock, and is used by the system control circuit 50.

The operation unit 70 includes a plurality of input devices (such as a button, a switch, and a dial) that can be operated by a user. Some of the input devices included in the operation unit 70 have names corresponding to assigned functions. A shutter button 61, a mode switching switch 60, and a power switch 72 are illustrated separately from the operation unit 70, for convenience, but are included in the operation unit 70. When the display device 28 is a touch display, a touch panel is also included in the operation unit 70. The operations performed on the input devices included in the operation unit 70 are monitored by the system control circuit 50. The system control circuit 50, upon detection an operation performed on an input device, executes processing according to the detected operation.

The shutter button 61 includes a first shutter switch (SW1) 62 that is turned on when entering a halfway-pressed state, and a second shutter switch (SW2) 64 that is turned on when entering a fully-pressed state. The system control circuit 50, upon detecting that the SW1 62 is turned on, executes a preparatory operation of still image shooting. The preparatory operation includes AE processing, AF processing, and the like. Also, the system control circuit 50, upon detecting that the SW2 64 is turned on, executes shooting and recording operations of a still image in accordance with the shooting conditions determined in the AE processing.

Also, the operation unit 70 of the present embodiment includes a line of sight detection unit 701 for detecting a line of sight direction of a user. The line of sight detection unit 701 is not a member that is directly operated by a user, but is included in the operation unit 70 because the line of sight direction detected by the line of sight detection unit 701 is treated as an input.

Figure 3A:
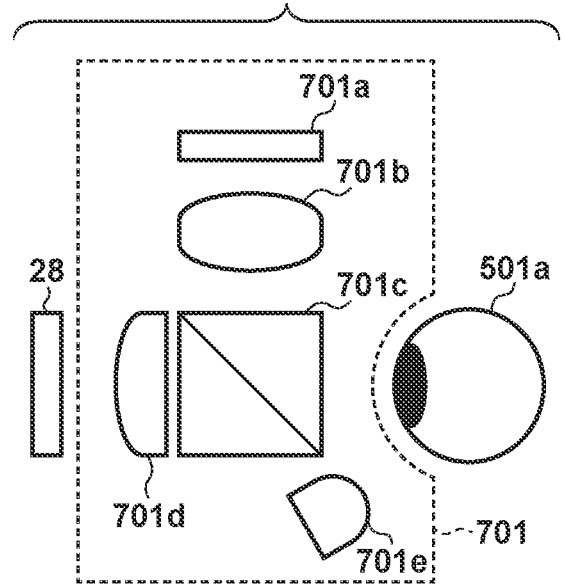
FIGS. 3A and 3B are schematic diagrams illustrating an exemplary configuration of a line of sight detection unit according to the embodiment.
Figure 3B:
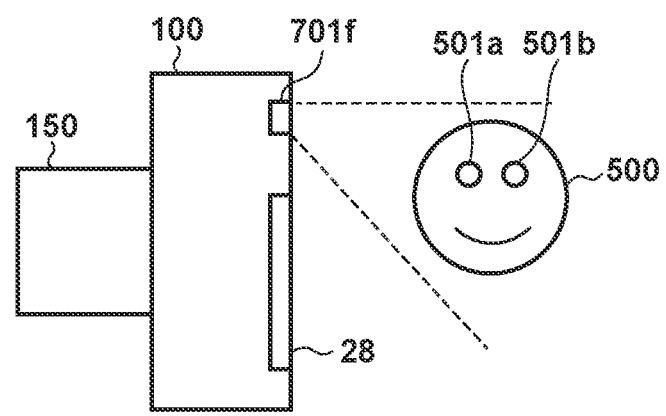

FIGS. 3A and 3B are side views schematically illustrating an exemplary configuration of the line of sight detection unit 701 provided inside a viewfinder. The line of sight detection unit 701 detects the rotation angle of the optical axis of an eyeball 501*a* of a user who looks at the display device 28 provided inside the main body 100 through an eyepiece of the viewfinder as the line of sight direction. Based on the direction of the detected line of sight, the position (gazed point on a display image) in the display device 28 at which the user gazes can be specified.

A live view image is displayed in the display device 28, for example, and the user can observe, by looking into a window of the eyepiece, contents displayed in the display device 28 through an eyepiece lens 701*d* and a dichroic mirror 701*c*. A light source 701*e* can emit infrared light in a window direction of the eyepiece (direction outward of the main body 100). When the user looks into the viewfinder, the infrared light emitted from the light source 701*e* is reflected by the eyeball 501*a* and returns to the inside of the viewfinder. The infrared light that has entered the viewfinder is reflected by the dichroic mirror 701*c* toward a light receiving lens 701*b*.

The light receiving lens 701*b* forms an eyeball image on an imaging plane of an image sensor 701*a* by the infrared light. The image sensor 701a is a two-dimensional image sensor including a filter for infrared light imaging. The number of pixels of the image sensor 701a for line of sight detection may be smaller than the number of pixels of the image sensor 22 for imaging. The eyeball image captured by the image sensor 701a is transmitted to the system control circuit 50. The system control circuit 50 detects a position of cornea reflection of the infrared light and a position of the pupil from the eyeball image, and detects the line of sight direction from the positional relationship therebetween. Also, the system control circuit 50 detects the position (gazed point on a display image) in the display device 28 at which the user gazes based on the direction of the detected line of sight. Note that the configuration may also be such that the image processing circuit 24 detects the position of cornea reflection and the pupil position from the eyeball image, and the system control circuit 50 acquires these positions from the image processing circuit 24.

Note that the present invention does not depend on the line of sight detection method or the configuration of the line of sight detection unit. Accordingly, the configuration of the line of sight detection unit 701 is not limited to the configuration shown in FIG. 3A. For example, as shown in FIG. 3B, the line of sight may also be detected based on a captured image obtained by a camera 701f that is arranged in the vicinity of the display device 28 provided on a back face of the main body 100. The angle of view of the camera 701f indicated by the dotted lines is determined so as to shoot a face of the user who performs shooting while looking at the display device 28. The line of sight direction can be detected based on an image of the eye area detected from an image captured by the camera 701f. In a case of using an infrared light image, shooting may be performed while projecting infrared light on a subject inside the angle of view by a light source 701e arranged in the vicinity of the camera 701f. The method of detecting the line of sight direction from an obtained image may be similar to the configuration in FIG. 3A. Also, in a case of using visible light image, light need not be projected. In a case of using visible light image, the line of sight direction can be detected from the positional relationship between the inner corners of eyes and the iris of the eye area, or the like.

Returning to FIG. 1 again, a power supply control circuit 80 is constituted by a battery detection circuit, a DC/DC converter, a switch circuit for switching blocks to which power is supplied, and the like, and detects whether or not a battery is attached, the type of the battery, and the battery residual capacity. Also, the power supply control circuit 80 supplies necessary voltages to the units including a storage medium 200 during necessary periods by controlling the DC/DC converter based on the detection results and the instruction from the system control circuit 50.

The power supply circuit 30 is constituted by a battery, an AC adapter, and the like. An I/F 18 is an interface with a storage medium 200 such as a memory card or a hard disk. A data file of captured images and sounds are recorded in the storage medium 200. The data file recorded in the storage medium 200 is read out through the I/F 18, and can be reproduced through the image processing circuit 24 and the system control circuit 50.

The communication circuit 54 realizes communication with an external device through at least one of wireless communication and wired communication. The image (including a live view image) captured by the image sensor 22 and the image recorded in the storage medium 200 can be transmitted to an external device through the communication circuit 54. Also, image data or other various types of information can be received from the external device through the communication circuit 54.

An orientation detection circuit 55 detects the orientation of the main body 100 relative to the direction of gravity. The orientation detection circuit 55 may be an acceleration sensor or an angular velocity sensor. The system control circuit 50 can record orientation information corresponding to the orientation detected by the orientation detection circuit 55 when shooting is performed to the data file for storing the image data obtained by the shooting. The orientation information can be used to display a recorded image in the same orientation as that when shooting was performed.

The main body 100 of the present embodiment can perform various types of control such that the characteristic area detected by the image processing circuit 24 becomes an appropriate image. Such control includes the following. Automatic focus detection (AF) for bringing a characteristic area into focus, automatic exposure control (AE) for causing the characteristic area to have a correct exposure, automatic white balance for making the white balance of the characteristic area appropriate, and automatic flash light amount adjustment for making the brightness of the characteristic area appropriate. However, there is no limitation thereto. The image processing circuit 24 (area detection unit) applies a known method on a live view image, detects areas that can be determined to have predetermined characteristics as characteristic areas, and outputs information regarding each characteristic area such as a position, a size, and reliability to the system control circuit 50, for example. The present invention does not depend on the type of the characteristic area and the detection method, and a known method can be used for detecting a characteristic area, and therefore the method of detecting a characteristic area will not be described.

Also, the characteristic area can also be used for detecting subject information. In the case of the characteristic area being a face area, the subject information includes whether or not a red-eye phenomenon occurs, whether or not eyes are closed, expression (e.g., smile), and the like, but there is no limitation thereto.

In the present embodiment, a user is supported in selecting, using the line of sight, one characteristic area (hereinafter, referred to as a main subject area) that is used for various types of control and for acquiring subject information, from a plurality of characteristic areas, which are exemplary plurality of image areas that differ in size and position. Hereinafter, the detected line of sight of a user is referred to as an LoS input.

Features of LoS Input

The features of the LoS input relative to an input made by operating a switch or a button are following two points. First, in the case of the LoS input, because the direction (line of sight direction) of the LoS input is continuously detected, the input timing of the user instruction cannot be specified. For example, in the case of a button operation, the timing at which a button operation is detected can be regarded as the timing of the user instruction. However, the line of sight direction is continuously detected and changes, and therefore it cannot be determined which of the line of sight directions at different points in time is the line of sight direction intended by the user.

Secondly, the line of sight direction is unstable due to being derived from a living body. Even if the user intends to gaze at one point, an eyeball may minutely move, or the line of sight may be unconsciously turned away. Therefore, in order to specify a gazed point in an image, the line of sight directions that have been detected over a certain period of time need to be statistically processed.

Outline of Method of Selecting Main Subject (or Main Subject Area) by LoS Input

In the present embodiment, a determination area is set for each detected characteristic area. Also, the period of time in which the position of gazed point is present inside the determination area is calculated as a gaze time regarding the characteristic area corresponding to the determination area. Then, the characteristic area corresponding to a determination area regarding which the gaze time first exceeds a threshold value is regarded as the main subject area selected by the user. Note that the selection of the main subject area is also selection of a subject being captured, and therefore is also referred to as selection of a main subject.

Figures 4A, 4B:
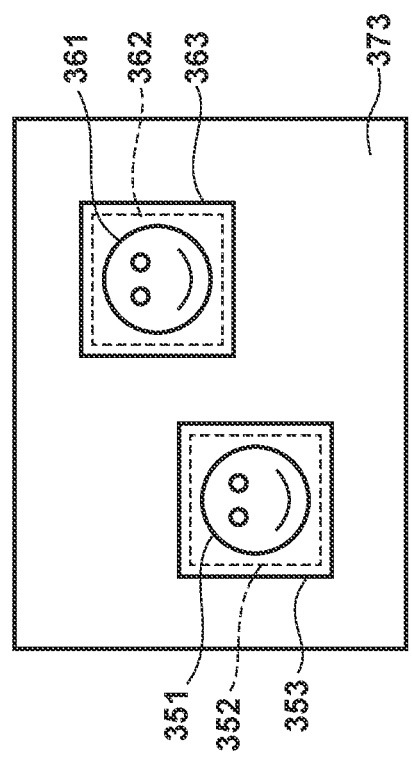
FIGS. 4A and 4B are diagrams relating to main subject selection according to a first embodiment.

FIG. 4A schematically illustrates an example in which, in a configuration in which a face area is detected as the characteristic area, two faces 351 and 361 are present in an image, and the image processing circuit 24 (area detection unit) has detected face areas 352 and 362. In FIG. 4A, determination areas 353 and 363 corresponding to the face areas 352 and 362, and a determination area 373 that does not correspond to a characteristic area are set. The method of setting the determination area will be described later.

FIG. 4B shows exemplary changes over time of gaze times based on the detected gazed points and exemplary determination of a main subject (area). FIG. 4B shows changes of values, in time series, that are stored in a region in the system memory 52 managed by the system control circuit 50. Here, it is assumed that the characteristic area detection and the gazed point detection are performed for each frame of the live view image. FIG. 4B shows, for first to sixth frames, the gazed areas detected for each frame, the accumulated gaze time for each determination area, and the determination result of a main subject. Note that the gazed area is a determination area including the position of the gazed point. Also, in the example shown in FIG. 4B, it is assumed that the threshold value (number of frames) of the gaze time is 3, and the determination areas are set in the first frame.

In the first frame, the determination area 353 is the gazed area, and therefore the system control circuit 50 updates the gaze time of the determination area 353 to 1 (frame). The system control circuit 50 does not update the gaze time regarding determination areas other than the gazed area. In the second frame as well, the determination area 353 is the gazed area, and therefore the system control circuit 50 updates the gaze time of the determination area 353 to 2 (frames). In the third frame, the gazed area changes to the determination area 373, and the system control circuit 50 updates the gaze time of the determination area 373 to 1 (frame). In the fourth frame, the gazed area changes to the determination area 363, and the system control circuit 50 updates the gaze time of the determination area 363 to 1 (frame). In the fifth frame, the gazed area changes to the determination area 353, and the system control circuit 50 updates the gaze time of the determination area 353 to 3.

At this point in time, the gaze time of the determination area 353 is greater than or equal to the threshold value, and therefore the system control circuit 50 determines that the subject 351 corresponding to the determination area 353 is the main subject. Also, when the main subject is set (changed), the system control circuit 50 resets the gaze times regarding all the determination areas to 0 (frames). In the sixth frame, the gazed area remains to be determination area 353, and the system control circuit 50 updates the gaze time of the determination area 353 to 1 (frame). In the sixth frame, a determination area for which the gaze time is greater than or equal to the threshold value is not present, and therefore the main subject remains to be the subject 351, similarly to the fifth frame.

In this way, if the gaze time of any of the determination areas is greater than or equal to the threshold value, the gaze times of all the determination areas are reset. Note that if the gaze time of the determination area 373 that does not correspond to a characteristic area is greater than or equal to the threshold value, the system control circuit 50 resets the gaze times of all the determination areas. Here, the determination result regarding the main subject may not be changed. Accordingly, even if an unintended subject is gazed at, as a result of changing the line of sight direction so as to gaze at an area other than the characteristic areas, the user can reset the gaze times. Also, if the gaze time of the determination area 373 that does not correspond to a characteristic area is greater than or equal to the threshold value, the selection result of the main subject may also be reset in addition to the gaze times being reset. In this case, the main subject cannot be selected unless the user gazes at any of the characteristic areas, and therefore whether or not the user gazes at a subject can be continuously detected.

Problems that Occur when Characteristic Area is Set as Determination Area

Figure 5A:
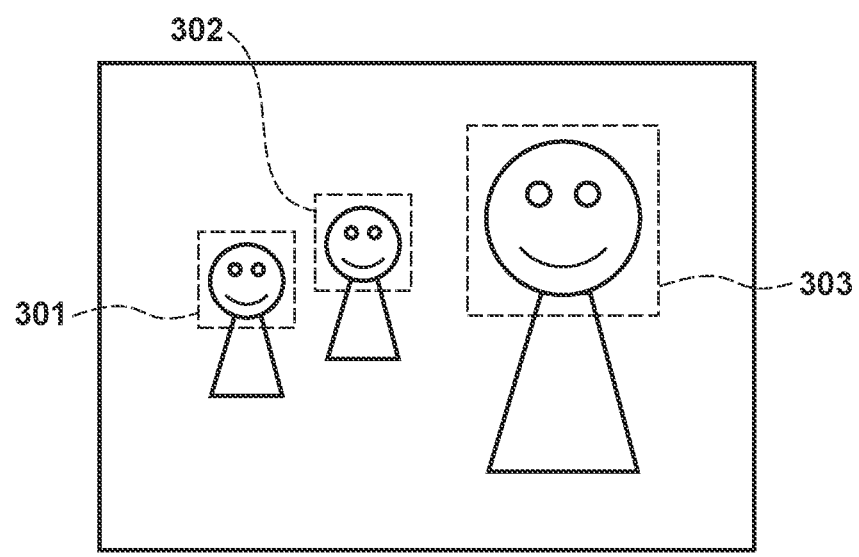
FIGS. 5A and 5B are diagrams illustrating setting of determination areas according to the first embodiment.

Next, problems that occurs when a characteristic area is set as the determination area as is will be described using FIGS. 5A and 5B. FIG. 5A shows an example in which three face areas 301 to 303 are detected as the characteristic areas. In the example shown in FIG. 5A, the face area 303 is larger than the face areas 301 and 302 due to the difference in subject distance. When the sizes of the characteristic areas differ in this way, if the characteristic areas are set as the determination areas as is, the selection of a subject corresponding to a small characteristic area becomes difficult relative to a subject corresponding to a large characteristic area. Also, even if the sizes of the characteristic areas do not differ, if the characteristic area decreases, selection of the subject becomes difficult.

Setting of Determination Area According to Present Embodiment

Figure 5B:
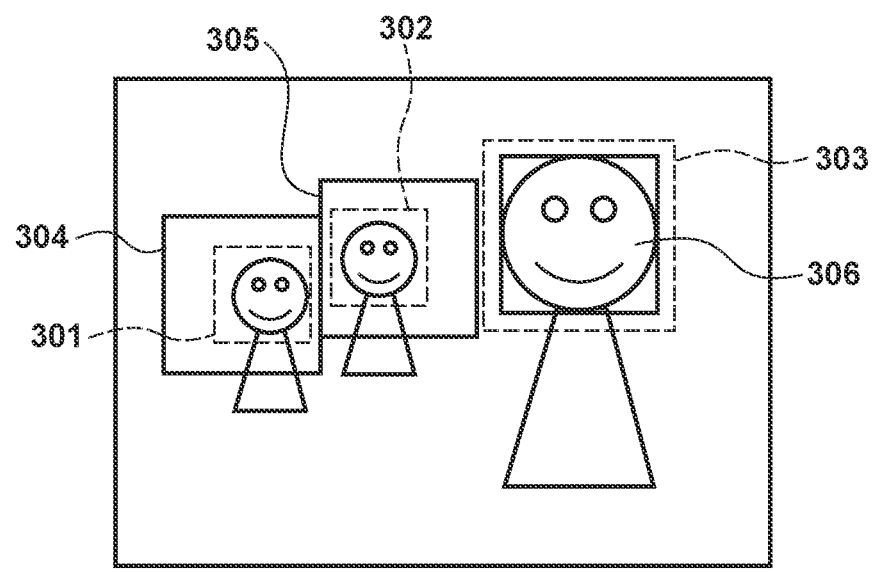

On the other hand, FIG. 5B shows an exemplary setting of the determination areas regarding the characteristic areas similar to those in FIG. 5A, in the present embodiment. In the example shown in FIG. 5B, determination areas 304 to 306 of the same size are set to all of the characteristic areas 301 to 303, respectively. With this, the difference in easiness of selection between subjects can be suppressed, and the selection of a subject whose characteristic area is small can be made easy. Here, when a determination area smaller than the characteristic area is set, the central coordinates thereof are set to be the same as those of the characteristic area. Also, when a determination area larger than the characteristic area is set, the setting is performed such that the characteristic area is included and the central coordinates are as close as possible to the central coordinates of the characteristic area. Note that the determination areas are set so as to not overlap each other.

Note that FIG. 5B shows an example in which determination areas of the same size are set to all the characteristic areas, as an exemplary method of setting the determination area in the present embodiment. However, determination areas of the same size need not be set to all the characteristic areas, if the difference in selection easiness due to the difference in size of the characteristic area can be suppressed, or if the selection easiness, which degrades due to the absolute size of the characteristic area being small, can be improved.

For example, with respect to a characteristic area whose size is smaller than a predetermined lower limit value, a determination area of a specific size (e.g., the size equal to the lower limit value) that is larger than the characteristic area may be set, and with respect to a characteristic area whose area is larger than or equal to the lower limit value, the characteristic area may be set as the determination area as is. Also, with respect to a characteristic area whose size is larger than or equal to a predetermined upper limit value and whose difference in size from the next larger characteristic area is larger than or equal to a threshold value, a determination area of a specific size that is smaller than the characteristic area (e.g., the size equal to the upper limit value) may also be set. Also, the size of the determination area may be dynamically determined according to the position or the size of the characteristic area. The details of the setting operation of the determination area will be further described later.

Operation of Selecting Main Subject by LoS Input

Next, the operation of selecting a main subject by the LoS input in the present embodiment will be described using flowcharts shown in FIGS. 6 to 8B. This operation can be executed in parallel to the operations regarding generation and display of a live view image, when the live view image is displayed in the display device 28 in a shooting stand-by state, for example.

In step S1, detection processing of characteristic areas is executed in the image processing circuit 24 (area detection means). The image processing circuit 24 outputs the number of detected characteristic areas and information regarding each of the characteristic areas (e.g., size, position, reliability) to the system control circuit 50. The characteristic area may be any characteristic area that can be detected using a known technique such as pattern matching, such as a human body area, a pupil area, an animal face area, or a vehicle area, the operation being not limited to face detection of a person. Also, only a candidate of the characteristic area may be detected.

In step S2, the system control circuit 50 (setting unit) sets the line of sight determination condition (position and size of the determination area, threshold value of the gaze time). The details of the operation of setting the line of sight determination condition will be described later.

In step S3, the system control circuit 50 displays an indicator (e.g., frame) indicating the position and size of each determination area determined in step S2 in the display device 28 so as to be superimposed on the live view image. Here, in order to grasp the correspondence relationship between the characteristic area and the determination area, with respect to the characteristic area as well, an indicator indicating the position and size thereof may be displayed in the display device 28 so as to be superimposed on the live view image. The indicator or the display mode is changed between the indicator representing the characteristic area and the indicator representing the determination area in order to make visual distinction therebetween possible. Note that a configuration may also be adopted in which the user is notified of only the characteristic area, and the determination area is only used in internal processing without notifying the user thereof.

In step S4, the system control circuit 50 (line of sight detection unit) acquires an image from the line of sight detection unit 701, and detects the line of sight direction, as described regarding FIGS. 3A and 3B. Moreover, the system control circuit 50 specifies the position (the position of the gazed point) in the display device 28 or the live view image at which the user gazes based on the direction of the detected line of sight.

In step S5, the system control circuit 50 specifies the determination area at which the user gazes based on the determination areas set in step S2 and the position of the gazed point detected in step S4. Also, the system control circuit 50 performs updating or resetting the gaze time and update processing of the main subject such as determining or changing the main subject, as described regarding FIGS. 4A and 4B. The details of the update processing of the main subject will be described later.

In step S6, the system control circuit 50 determines whether or not an end condition is satisfied such as turning on of the SW1 62 or SW2 64 being detected or the line of sight detection being unable, for example. If it is determined that the end condition is satisfied, the system control circuit 50 ends the processing while determining that the main subject determined at this point in time is selected. On the other hand, if it is not determined that the end condition is satisfied, the system control circuit 50 returns the processing to step S1.

Note that if a frame rate F1 when a characteristic area is detected differs from a frame rate F2 when the line of sight detection is performed, processing in steps S1 to S3 may be performed at the frame rate F1, and the processing in steps S4 and S5 may be performed at the frame rate F2.

Setting Line of Sight Determination Condition

Next, the details of setting the line of sight determination condition to be performed in step S2 in FIG. 6 will be described. Here, the determination area is a square shape, and a center position is determined as the position, but these are merely exemplary, and the determination area may also be another shape or another position may also be determined.

As described regarding FIGS. 5A and 5B, if the determination area is small, it is difficult to select a corresponding subject by the LoS input. Therefore, it is desirable that a determination area having a size to some degree or more is set to each of all of the characteristic areas. However, with respect to a characteristic area whose size is less than or equal to a threshold value, if a determination area whose center position is the same as that of the characteristic area and whose size is larger than the threshold value by a predetermined size is set, the determination areas with respect to a plurality of close characteristic areas may overlap.

It is conceivable to set the determination area such that the center position thereof is shifted from the center position of the corresponding characteristic area, but if the shift between the center positions increases, the correspondence relationship between the determination area and the characteristic area becomes unclear, and the user may be confused.

From such a viewpoint, in the present embodiment, the system control circuit 50 temporarily sets a determination area whose center position is the same as that of the characteristic area and whose size is set so as to not overlap other determination areas. Also, if the temporarily set size of the determination area exceeds a predetermined lower limit value, the system control circuit 50 sets the temporarily set determination area as an ultimate determination area. On the other hand, if the temporarily set size of the determination area is less than the predetermined lower limit value, the system control circuit 50 changes the size to the lower limit value and thereafter changes the position of the determination area. Specifically, the system control circuit 50 determines the position by searching the position at which the determination area does not overlap the other determination areas with a movement amount that is less than or equal to a threshold value. In this way, if the size of the temporarily set determination area is less than the lower limit value, the system control circuit 50 sets a determination area whose size is the lower limit value and whose center position is shifted from the center position of the corresponding characteristic area. According to the present embodiment, with respect to characteristic areas that differ in position and size, determination areas can be set while securing selection easiness by the line of sight.

Figure 8A:
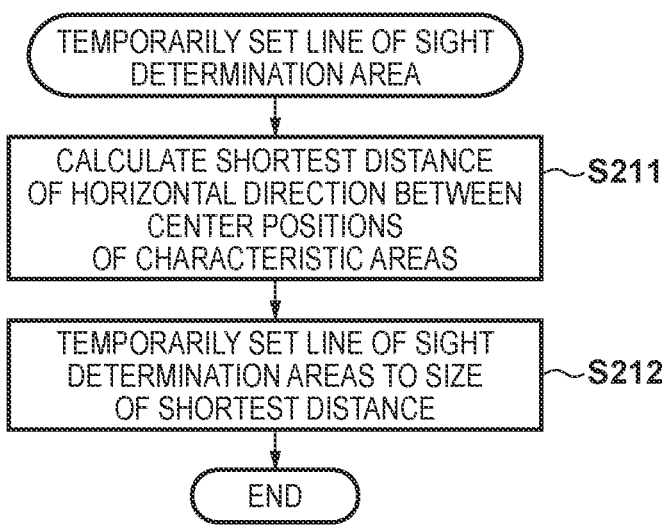
FIGS. 8A and 8B are flowcharts relating to size determination and rearrangement of determination areas according to the first embodiment.
Figure 8B:
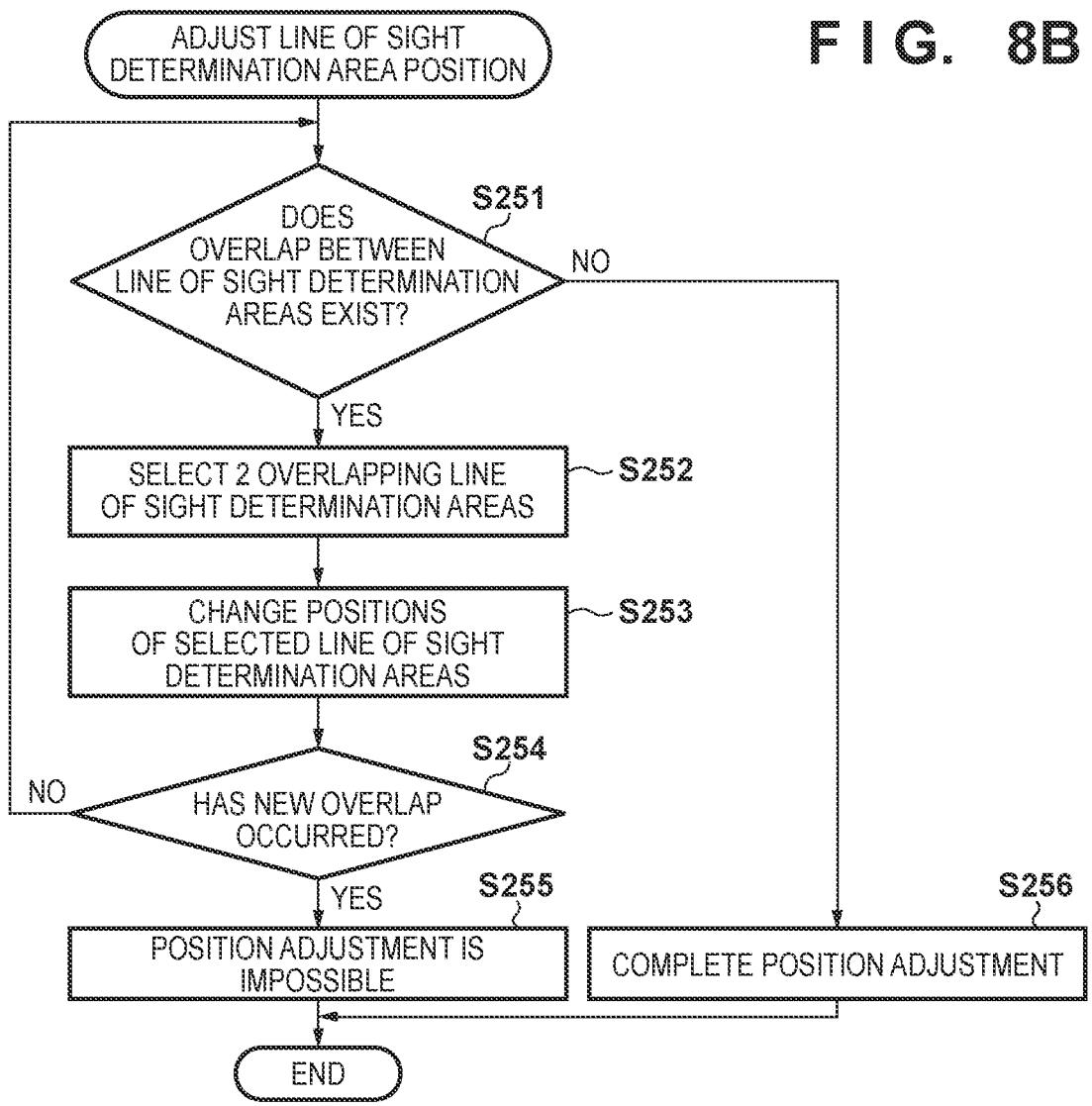

The specific setting operation of the determination area will further be described using the flowcharts in FIGS. 7 to 8B. Note that the determination area that does not correspond to a characteristic area such as the determination area 373 shown in FIG. 4A is separately set from the operation described here. In step S21, the system control circuit 50 temporarily set a determination area with respect to each of the characteristic areas. The temporary setting will further be described using the flowchart in FIG. 8A. Here, the size of the determination area is determined considering only the horizontal direction in order to simplify the description, but both of the horizontal direction and the vertical direction may be considered.

The system control circuit 50 temporarily sets a determination area having a largest size in a range in which overlapping with other determination areas does not occur. First, in step S211, the system control circuit 50 calculates distances between all of the detected characteristic areas. Here, a shortest distance, in the horizontal direction, of the distances between center positions of the characteristic areas are calculated. Also, in step S212, the system control circuit 50 temporarily sets determination areas whose size in the horizontal direction is the calculated shortest distance. That is, the sizes of the temporarily set determination areas are the same regardless of the sizes of the characteristic areas. In the present embodiment, the determination area is a square, and therefore the size in the vertical direction is the same as the size in the horizontal direction. Note that, at this point in time, the size of the calculated shortest distance is not considered.

As a result of determining the sizes of the determination areas in this way, determination areas that each do not overlap the other determination areas at least in the horizontal direction can be temporarily set. Note that when the vertical direction is also considered, the smaller of the shortest distances in the vertical direction and in the horizontal direction between the center positions of the characteristic areas can be used as the size of the determination area, for example.

Note that, with respect to a determination area whose size is largely different from the size of the corresponding characteristic area (the ratio of sizes in the horizontal direction is greater than or equal to a threshold value, for example), the size may be changed. For example, if a determination area is too small relative to a characteristic area, the size of the determination area can be increased, and if the size is too large, the size can be decreased. For example, the maximum value and minimum value of the size of the determination area are determined in advance, in which the size of the characteristic area is defined as 1, and adjustment may be performed such that the size is adjusted to the maximum value if the temporarily set size is larger than the maximum value, and is adjusted to the minimum value if the temporarily set size is smaller than the minimum value.

Figure 9A:
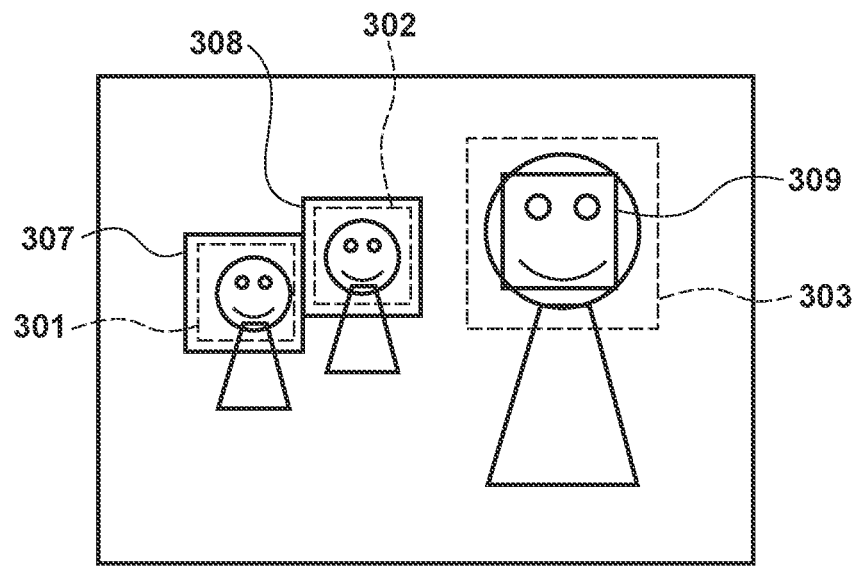
FIGS. 9A and 9B are diagrams illustrating an example of determination areas according to the first embodiment.

Exemplary characteristic areas and temporarily set determination areas are shown in FIG. 9A. FIG. 9A shows an example in which three face areas are detected as characteristic areas, similarly to FIG. 5A. In FIG. 9A, determination areas 307 to 309 are temporarily set with respect to characteristic areas 301 to 303. In the example in FIG. 9A, the characteristic areas with respect to which the distance between the center positions is shortest are the characteristic areas 301 and 302. Because the size of the determination area is set to be the same as the distance between the centers of the characteristic areas 301 and 302, the determination areas 307 and 308 are in contact in the horizontal direction.

Returning to FIG. 7, in step S23, the system control circuit 50 determines whether or not the sizes of the temporarily set determination areas are smaller than the predetermined lower limit value. If it is determined that all of the sizes of the temporarily set determination areas are greater than or equal to the lower limit value, the system control circuit 50 sets the temporarily set determination areas as the ultimate determination areas, and advances the processing to step S26. On the other hand, if it is determined that a temporarily set determination area whose size is smaller than the lower limit value is present, the system control circuit 50 advances the processing to step S24.

Note that the lower limit value used in step S23 is a value determined in advance as the size of the determination area with respect to which selection by the LoS input is not difficult. The lower limit value can be experimentally determined as a value with which sufficient LoS input accuracy can be realized while considering the detection accuracy of the line of sight detection unit 701 and the variation in the line of sight direction between users, for example. Here, the sizes of the temporarily set determination areas 307 to 309 shown in FIG. 9A are the same (not adjusted), and are smaller than the lower limit value.

Figure 9B:
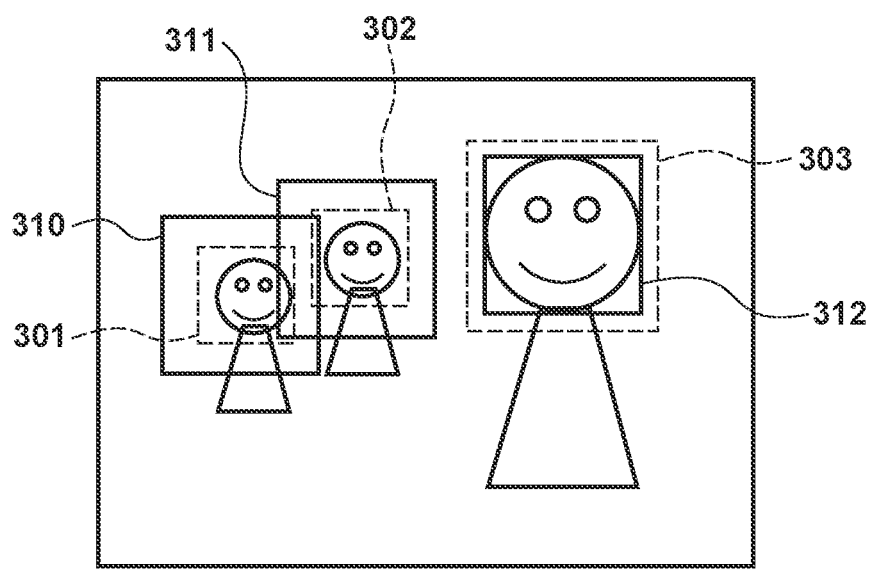

In step S24, the system control circuit 50 changes the size, of a determination area of the temporarily set determination areas, that is smaller than the lower limit value to the lower limit value. FIG. 9B shows determination areas 310 to 312 that are obtained by changing the sizes of the determination areas 307 to 309 to the lower limit value. When the sizes of the determination areas are increased to the lower limit value, determination areas that overlap each other such as the determination areas 310 and 311 may occur.

In step S25, the system control circuit 50 adjusts the positions of the determination areas in order to resolve overlaps between the determination areas that occurred in the processing in step S24. The details of the position adjustment will be described using the flowchart shown in FIG. 8B.

In step S251, the system control circuit 50 determines whether or not an overlap between determination areas exists. If it is determined that an overlap exists, the system control circuit 50 advances the processing to step S252, and if not, the system control circuit 50 advances the processing to step S256.

In step S252, the system control circuit 50 selects two determination areas that overlap. Note that the number of overlaps is only one in the example shown in FIG. 9B, but if a plurality of sets of determination areas that overlap each other are present, one set can be selected successively in the descending order of the distances between the center positions, for example. This is because it is considered that as the distance between the center positions of determination areas increases, the overlap can be resolved with smaller adjustment amount, and finally the larger number of overlaps can be resolved.

It is highly possible that determination areas whose distance between the center positions is small are set in a region where characteristic areas are densely located, and therefore it is estimated that it is highly possible that, if positions of determination areas are adjusted so as to resolve one overlap, another overlap occurs. Also, even if all the overlaps can be resolved, since the determination areas are densely located, it is estimated that it is not easy do select a desired area by the line of sight. Therefore, when a plurality of sets of determination areas that overlap each other are present, the positions are adjusted with respect to a set that is selected in the descending order of the distances between the center positions.

In step S253, the system control circuit 50 changes the positions of the selected two determination areas. In the example shown in FIG. 9B, the system control circuit 50 moves, in the horizontal direction, the positions of the determination areas 310 and 311 such that the distance between the center positions increases. Note that only the horizontal direction is considered in the present embodiment, and therefore the positions are moved in the horizontal direction. If the horizontal direction and the vertical direction are considered, the positions may also be moved in the vertical direction.

Note that, here, in order to reduce the shift, in the distance between center positions, between the characteristic areas and the determination areas, the positions of both of the two determination areas are changed. However, if the shift, in the distance between center positions, between the characteristic areas and the determination areas is in a predetermined range, the position may also be changed with respect to only one of the determination areas. The state in which the overlap is resolved, in step S253, by moving the determination area 310 in a horizontal left direction and the determination area 311 in a horizontal right direction is the state shown in FIG. 5B.

In step S254, the system control circuit 50 determines whether or not a new overlap have occurred between determination areas as a result of the position adjustment performed in step S253, if it is determined to have occurred, advances the processing to step S255, and if not, returns the processing to step S251.

In step S255, the system control circuit 50 determines that position adjustment such that determination areas do not overlap is not possible, and ends the processing. In this case, the determination area that does not overlap the other determination areas can be validated, and the determination area that overlaps another determination area can be invalidated. The characteristic area corresponding to the invalidated determination area cannot be selected using the line of sight.

In step S256, the system control circuit 50 determines that an overlap between the determination areas is not present, and ends the processing.

Returning to FIG. 7, in step S26, the system control circuit 50 sets a threshold value of a gaze time. If the threshold value of the gaze time is long, the main subject is not easily switched, and if short, the main subject is easily switched. The threshold value of the gaze time may be in common with respect to all the subjects (characteristic areas).

However, the threshold value may be changed according to the characteristic area. For example, it is highly possible that a small characteristic area is adjacent to another small characteristic area. Therefore, the threshold value of the gaze time may be increased with respect to a small characteristic area relative to a large characteristic area in order to avoid frequent switching of the main subject. Alternatively, it is highly possible that a large characteristic area is a subject intended by the user, and therefore the threshold value of the gaze time may be decreased in order to be set as the main subject in a short time. Also, the configuration may be such that the user can set, from the menu screen, whether the threshold value of the gaze time is increased or decreased, for example.

Flowchart of Updating Main Subject

Figure 10:
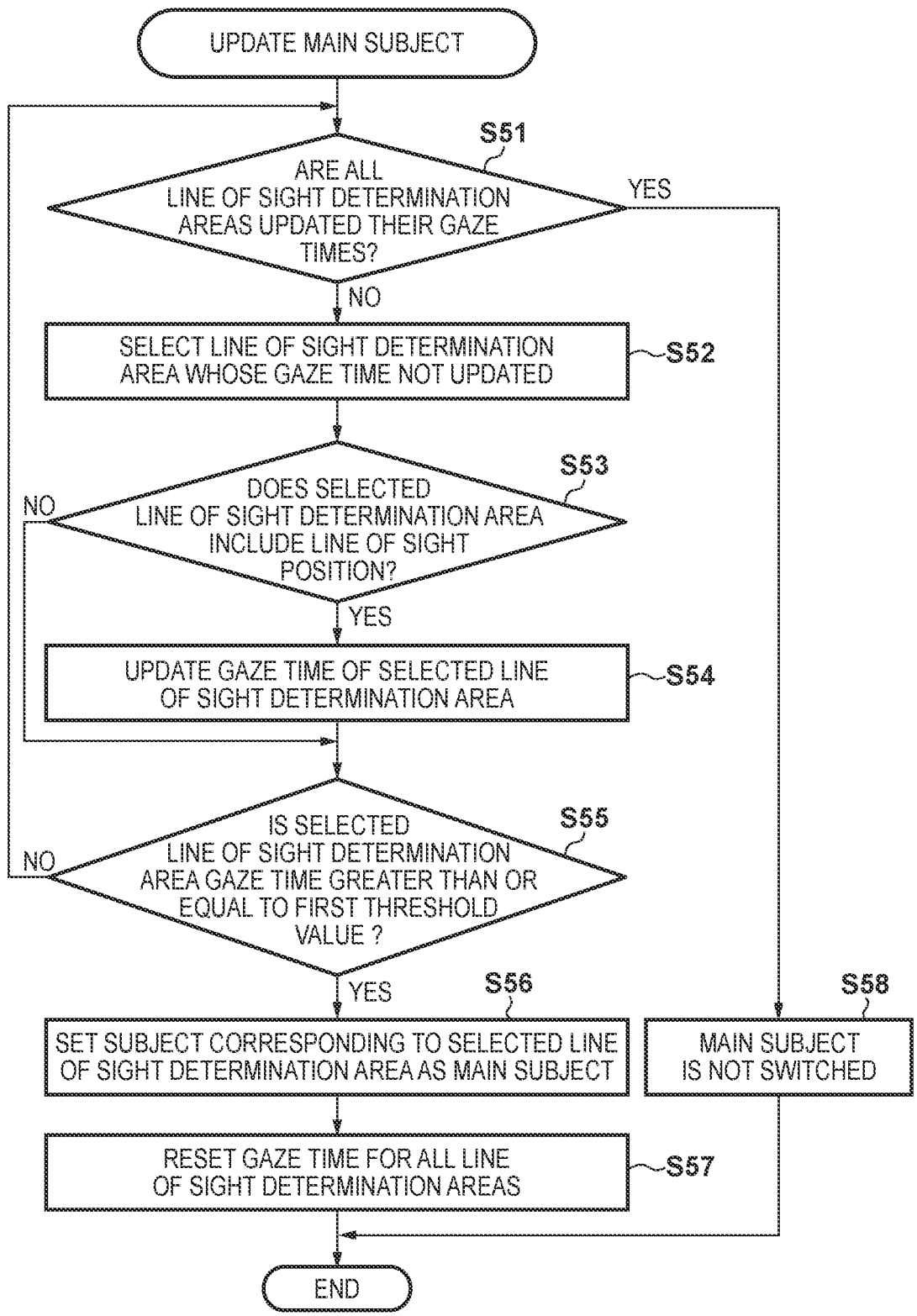
FIG. 10 is a flowchart relating to an updating operation of a main subject according to the first embodiment.

Next, the details of the operation for updating the main subject that is performed in step S5 in FIG. 6 will be described using the flowchart shown FIG. 10. As described with reference to FIGS. 4A and 4B, the system control circuit 50 updates the gaze time for each determination area based on the line of sight determination condition set in step S2 and the position of the gazed point detected in step S4. Also, in response to the gaze time having reached the threshold value, the system control circuit 50 updates the main subject.

In step S51, the system control circuit 50 determines whether or not the gaze time has been updated with respect to all the determination areas, if the determination is affirmative, advances the processing to step S58, and if not, advances the processing to step S52. Note that, here, the determination is also performed with respect to a determination area (determination area 373 in FIG. 4A) that does not correspond to the characteristic area.

In step S52, the system control circuit 50 selects one determination area with respect to which the gaze time has not been updated.

In step S53, the system control circuit 50 determines whether or not the position of the gazed point detected in step S4 is present inside the selected determination area, if the determination is affirmative, advances the processing to step S54, and if not, advances the processing to step S55.

In step S54, the system control circuit 50 updates the gaze time of the selected determination area. In the present embodiment, one unit of the gaze time is one frame, and therefore the system control circuit 50 increases the count value corresponding to the selected gaze determination area by one.

In step S55, if it is determined that the gaze time of the selected determination area is greater than or equal to a first threshold value, the system control circuit 50 advances the processing to step S56, and if not, returns the processing to step S51, and performs the operation for updating the gaze time with respect to the next determination area.

In step S56, the system control circuit 50 (selection unit) selects the subject corresponding to the selected determination area as the main subject. Note that if the selected determination area is a determination area that does not correspond to any of the characteristic areas, the system control circuit 50 does not change the main subject, or changes the state to a state in which the main subject is not selected. The configuration may be such that, when the main subject is not changed, the main subject does not change even if the user looks at an area other than the characteristic areas. This configuration is suitable for a situation in which the user looks at an area other than the main subject in order to determine the composition when capturing a landscape, for example. On the other and, if the state is changed to a state in which the main subject is not present, this configuration is suitable for the situation in which the user frequently changes the main subject (situation in which a subject is likely to frame in or frame out, for example). Therefore, the system control circuit 50 may determine the operation that is to be performed when the gaze time regarding the determination area that does not correspond to any of the characteristic areas has exceeded the threshold value, based on the selected shooting mode, the recognition result of the shooting scene, or the like.

In step S57, the system control circuit 50 resets the gaze time to 0 with respect to all the determination areas, and ends the operation for updating the main subject.

In step S58, the system control circuit 50 ends the updating operation without changing the main subject.

As described above, in the present embodiment, a determination area having a size of at least a predetermined lower limit value is set with respect to each of the plurality of image areas that differ in size and position regardless of the size of the image area. Therefore, stable selection using the line of sight can be realized with respect to a small image area as well.

Second Embodiment

Next, a second embodiment of the present invention will be described. In the present embodiment, the line of sight determination condition is set considering the characteristic of the subject. For example, it is possible to, using a trained convolutional neural network or the like, determine the scene that is to be captured such as landscape, a group photograph, or soccer, and to detect the orientation of a part (e.g., a head, a pupil, a hand, and a leg) of a person. The line of sight determination condition appropriate for the characteristic of the subject is automatically set, and therefore a comfortable input operation using the line of sight can be realized. In the present embodiment, the line of sight determination condition is set considering (1) motion and (2) a part of interest, as examples of the characteristic of a subject. In the following description, the constituent elements and operations that will not be specifically described are the same as those in the first embodiment.

Also, the line of sight determination condition is set considering the type of the subject as well. In the present embodiment, it is assumed that the image processing circuit 24 includes detectors for specific subjects, and a table indicating the line of sight determination conditions corresponding to detection results are stored in the nonvolatile memory 56 in advance. Here, it is assumed that the image processing circuit 24 includes detectors respectively for three types of subjects, namely people, an animal, and a train, and the nonvolatile memory 56 stores a table in which the determination conditions for the respective types of the subject are stored. If a detection result indicating that the subject is an animal is given from the image processing circuit 24, the system control circuit 50 acquires the line of sight determination condition appropriate for the animal from the nonvolatile memory 56 and sets the condition. Note that if the line of sight determination condition is set based on a characteristic that can be calculated when needed, such as the motion of a subject, the line of sight determination condition need not be stored in advance.

Utilization of Motion Characteristics of Subject

As a result of using the line of sight determination condition in accordance with the motion characteristic of the subject, a comfortable LoS input operation can be realized. The period from frame-in until frame-out is short with respect to a subject whose motion is fast. Therefore, as a result of reducing the threshold value of the gaze time with respect to a subject whose motion is fast, the main subject can be easily selected. The subjects whose motion is fast include a racing car, a train, an airplane, an animal, and a child, for example. Therefore, if these subjects are detected in the image processing circuit 24, the threshold value of the gaze time is set short such that the main subject can be selected quickly.

Also, as a result of the determination area being increased, even if a delay occurs in setting and displaying the determination area relative to displaying of the subject, a stable LoS input operation can be realized. Specifically, as a result of the lower limit value used in steps S23 and S24 in FIG. 7 being set to a large value, a margin for the display delay can be provided.

On the other hand, with respect to a subject whose motion is slow or that stands still, it is better to increase the threshold value of the gaze time. If the threshold value of the gaze time is small, the main subject is easily switched in the middle of the user determining the composition while looking at various positions inside the angle of view, and the usability degrades. Such subjects (scenes) include a group photograph and a scenic photograph, for example. Therefore, when these subjects and scenes are detected in the image processing circuit 24, or the motion of the subject is slow (less than a threshold value), the threshold value of the gaze time is set long.

Also, an unintended main subject is not easily detected by decreasing the determination area even if the line of sight is moved in order to determine the composition. Specifically, a method is conceivable in which, in step S3 in FIG. 6, after setting the determination areas, the sizes of the determination areas whose sizes are greater than or equal to a lower limit value are reduced at a uniform rate. However, if the size of a determination area decreases below the lower limit value, the size thereof is set to the lower limit value.

Note that the threshold value of the gaze time can be adjusted so as to decrease or increase relative to a reference threshold value of the gaze time. The reference threshold value of the gaze time may be a predetermined standard value, but there is no limitation thereto.

Utilization of Past Position of a Gazed Point Regarding a Fast-Moving Subject

Also, with respect to a fast-moving subject, the position of the gazed point may be detected before setting the determination area. If the detection of the position of the gazed point is started after the determination area is set, it takes at least a time equal to the threshold value of the gaze time until a main subject is selected firstly. Therefore, the photo opportunity may be missed before the main subject is selected.

Therefore, if the motion of subjects is fast (a threshold value or more, for example), the system control circuit 50 calculates, with respect to time series data of the position of the gazed point detected before setting the determination area, a moving average of a predetermined number of pieces of immediate data, as the position of the gazed point immediately before, for each frame. Then, the system control circuit 50, upon setting the determination area, immediately selects the subject corresponding to the determination area including the position of the gazed point immediately before as the main subject. With this, the time lag until the main subject is selected firstly can be reduced. Note that if the motion of subjects is fast, the time needed to adjust the size and position of the viewpoint determination area may be reduced by using the characteristic area as the determination area as is.

Note that whether such control is performed or not may be switched according to the type of the subject. For example, the configuration may be such that, even if the motion of the subject is fast, when the pupil area of a person is detected as the characteristic area, the position of the gazed point immediately before is not used, and when the pupil area of an animal is detected as the characteristic area, the position of the gazed point immediately before is used. Also, whether the position of the gazed point immediately before is used or not may be switched according to another characteristic of the subject.

Utilization of Information Regarding Part on which User Focuses

There are cases where the parts, of the characteristic area, at which the user gazes are unevenly distributed. For example, when the characteristic area is a face area, it is highly possible that the user gazes at eyes in the face area, that is, the upper half of the face area. Also, when the characteristic area is a whole-body area of a person, it is highly possible that the user gazes at a head, of the whole-body area, that is, the upper end portion of the whole-body area.

Therefore, when the determination area is temporarily set in step S21 in FIG. 7, the center position of the determination area may be shifted, from the center position of the characteristic area, in the direction of the area at which the user highly possibly gazes. For example, it is conceivable that, if the characteristic area is a face area, the center position of the determination area that is to be temporarily set is shifted upward by a predetermined ratio (e.g., 25%) of the size in the longitudinal direction of the determination area, or the like. Note that the amounts or ratios of shift of the center position can be determined in advance according to the types of the characteristic area.

When the center position of the determination area is set considering the gazing tendency of the user, there may be cases where the association with the corresponding characteristic area is not obvious. Therefore, when the indicators indicating the determination areas are displayed as in FIGS. 4A and 5B, the center positions in a state in which the gazing tendency of the user is not considered may be used.

Also, there are cases where the gazed part and the part that is desired to be brought into focus are different. For example, a case is conceivable where, when a soccer scene is to be captured, although the user desires to bring the pupils of a player into focus, the user gazes at a ball. In such a case, when the size of a determination area is calculated in step S21 in FIG. 7, the size of the determination area can be set also considering the gazing tendency of the user.

On the other hand, focus detection may also be performed using only the parts that the user highly possibly brings into focus, of the detected characteristic areas. For example, when a whole body area is detected in a soccer scene, it is highly possible that the user gazes at the feet of a player, and therefore, the size of the determination area can be increased in the direction of the feet by a predetermined ratio (e.g., 20%) of the size of the whole body area in the longitudinal direction. Meanwhile, it is highly possible that the face or pupils are desired to be brought into focus, the upper end portion (a portion, from the upper end, of only 20% of the size in the longitudinal direction, for example) of the whole-body area can be used in focus detection.

Note that instead of estimating areas such as a head, a leg, and a hand from the whole-body area, the areas may be detected such as a head area, a leg area, and the hand area by applying part detection processing on the whole-body area.

Note that the configuration may also be such that the parts are detected, and the line of sight determination conditions are respectively set to the parts using the motion information of the subject. For example, in boxing, it is anticipated that the hands frequently move, and therefore it is conceivable to set large determination areas to hand areas of persons in a boxing scene. Also, it is conceivable to set a short threshold value of the gaze time such that the main subject can be determined with a short gaze time.

Note that the settings of the determination area, the focus detection area, the threshold value of the gaze time, and the like described above can be automatically changed by the system control circuit 50 based on the results of scene determination and detection of the characteristic area performed by the image processing circuit 24. Of course, a configuration may also be employed in which the user selects a part such as a head, a hand, or a leg from the menu screen, and sets the size of a determination area, the area to be used as the focus detection area, the threshold value of the gaze time, and the like for each part.

Also, there are cases where the user will not gaze at a subject depending on the orientation of the subject. For example, when a group photograph is captured, it is highly possible that a person whose face is not directed forward is a person that is not related to the group photograph, and it is less likely that the user selects the person as the main subject. Therefore, the configuration may also be such that when it is determined to be a group photograph by the scene determination made by the image processing circuit 24, the determination area is set only to face areas that are determined to be directed forward. Also, the size of the determination area and the threshold value of the gaze time may be changed based on the ratio of the face areas that are directed forward.

According to the present embodiment, the size of the determination area, the threshold value of the gaze time, the focus detection area, and the like are changed or set in accordance with the shooting scene and the characteristics (such as the type and the motion speed) of the subject. With this, the selection and focus detection of a main subject using the line of sight can further be made to meet the user's intention.

Third Embodiment

Next, a third embodiment of the present invention will be described. In the present embodiment, the line of sight determination condition is set considering the distance information regarding the characteristic area (subject). The objective of considering the distance information is to suppress degradation in the quality and mobility of focus detection.

For example, a case is assumed where a subject on a near side that the user tries to bring into focus and another subject located on a far side are alternatingly selected as the main subject due to the unintentional movement of the line of sight of the user. When the setting is such that the main subject is brought into focus, the focus distance largely changes in the front-back direction every time the main subject is switched, and therefore the quality of focus detection degrades. Also, if an unintended subject is brought into focus, in order for the user to return the state to a state in which the intended subject is brought into focus, a period of time equal to at least the threshold value of the gaze time is needed until the intended subject is selected as the main subject, and therefore the mobility is degraded.

In the present embodiment, the main subject candidates are narrowed down, in addition to setting the line of sight determination condition considering the distance information regarding the subject. Accordingly, a subject that is not intended by the user is not easily selected as the main subject, and the degradation in the focus detection and mobility can be suppressed.

Figure 11:
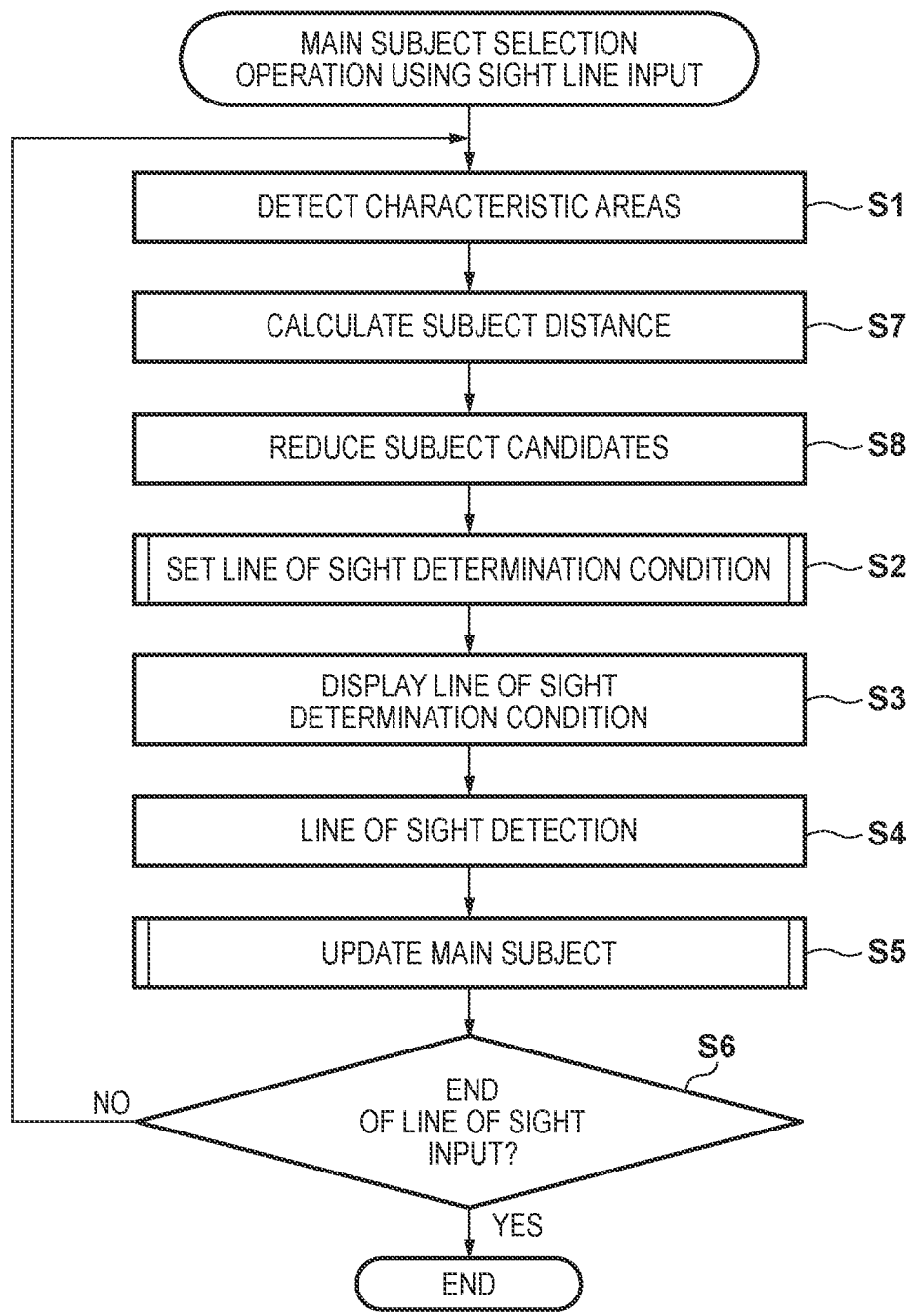
FIG. 11 is a flowchart relating to a selection operation of a main subject according to a third embodiment.

FIG. 11 is a flowchart regarding the operation of selecting the main subject using the LoS input in the present embodiment. In FIG. 11, the steps in common with the first embodiment are given the same reference numerals as those in FIG. 6, and redundant descriptions will be omitted. The present embodiment differs from the first embodiment in that steps S7 and S8 are added between step S1 and step S2. In the following, a description will be given regarding steps S7 and S8, which are features of the present embodiment.

In step S7, the system control circuit 50 acquires distance information for each characteristic area. The method of acquiring the distance information is not specifically limited, and any known method can be used. For example, the distance information at each pixel position may be calculated from a parallax image pair constituted by an image based on signals obtained from the photoelectric conversion regions 201a and an image based on signals obtained from the photoelectric conversion regions 201b. In this case, a representative distance (e.g., an average distance) for each area is acquired from the distance information at each pixel position. Also, the distance information may be obtained from the focus lens position when each characteristic area is brought into focus.

In step S8, the system control circuit 50 narrows down the main subject candidates. The system control circuit 50 can be configured to not select a subject (characteristic area) whose difference in distance from the currently selected main subject (characteristic area) is greater than or equal to a threshold value, as the main subject, for example. The system control circuit 50 can be configured to not select a characteristic area as the main subject by not setting a determination area regarding the characteristic area, for example.

Note that, the system control circuit 50 is configured to, when a main subject is not selected, not select a subject (characteristic area), as the main subject, whose difference in distance from the distance corresponding to the current focus lens position is greater than or equal to a threshold value. Note that the distance serving as the reference when the main subject is not selected may also be another distance such as a predetermined fixed value. In this way, as a result of disabling selection, by the LoS input, of a subject whose difference in distance from the currently selected main subject is large, the operation that is not intended by the user can be suppressed from being performed.

Note that, here, the subject corresponding to an upper limit is configured to be not selected as the main subject, but the subject may also be configured to be not easily selected. For example, in the setting of the threshold value of the gaze time (step S26 in FIG. 7), of the setting of the line of sight determination condition in step S2, threshold values according to the differences in distance from the selected main subject may be set. Specifically, a threshold value larger than that of a subject (characteristic area) whose difference in distance is less than a threshold value is set to a subject (characteristic area) whose difference in distance is greater than or equal to the threshold value. With this, a subject whose difference in distance from the current main subject is large is not easily selected as the new main subject.

Also, if it is determined that the size of the determination area is greater than or equal to the lower limit value (NO in step S23) in the setting processing of the line of sight determination condition (FIG. 7), the size of the determination area may be set to the lower limit value with respect to the characteristic area corresponding to a subject whose difference in distance from the current main subject is greater than or equal to the threshold value. When the sizes of the temporarily set determination areas are all greater than or equal to the lower limit value, a determination area having an easily selectable size is also being set to a subject whose difference in distance from the current main subject is large. Therefore, the size of the determination area is set to the lower limit value with respect to the characteristic area corresponding to a subject whose difference in distance from the current main subject is greater than or equal to the threshold value, and as a result selection easiness can be reduced.

According to the present embodiment, as a result of setting the line of sight determination condition considering the distance information regarding a characteristic area (subject), the degradation in quality and mobility of focus detection can be suppressed.

Fourth Embodiment

Next, a fourth embodiment of the present invention will be described. In the present embodiment, the line of sight determination condition is set considering the motion vector of a characteristic area (subject). Note that a motion vector in an in-plane direction is considered in the present embodiment, and the motion vector in a depth direction is not considered. Note that the motion vector in the depth direction is not considered regarding setting of the line of sight determination condition, but the motion vector in the depth direction may be considered for the purpose of improving the calculation accuracy of the motion vector in the in-plane direction.

The purpose of considering the motion vector of a subject is to make the selection of the main subject by the LoS input possible even if line of sight tracking is delayed, or updating of the determination area is delayed, relative to the (in-plane) motion of the subject. When a determination area is set to a characteristic area, and the main subject is selected based on the position of gazed point and the determination area, it becomes difficult to select the main subject due to the influence of these delays. Therefore, in the present embodiment, selection of a moving subject by the LoS input is made possible by relaxing the line of sight determination condition and considering the motion vector.

Figure 12:
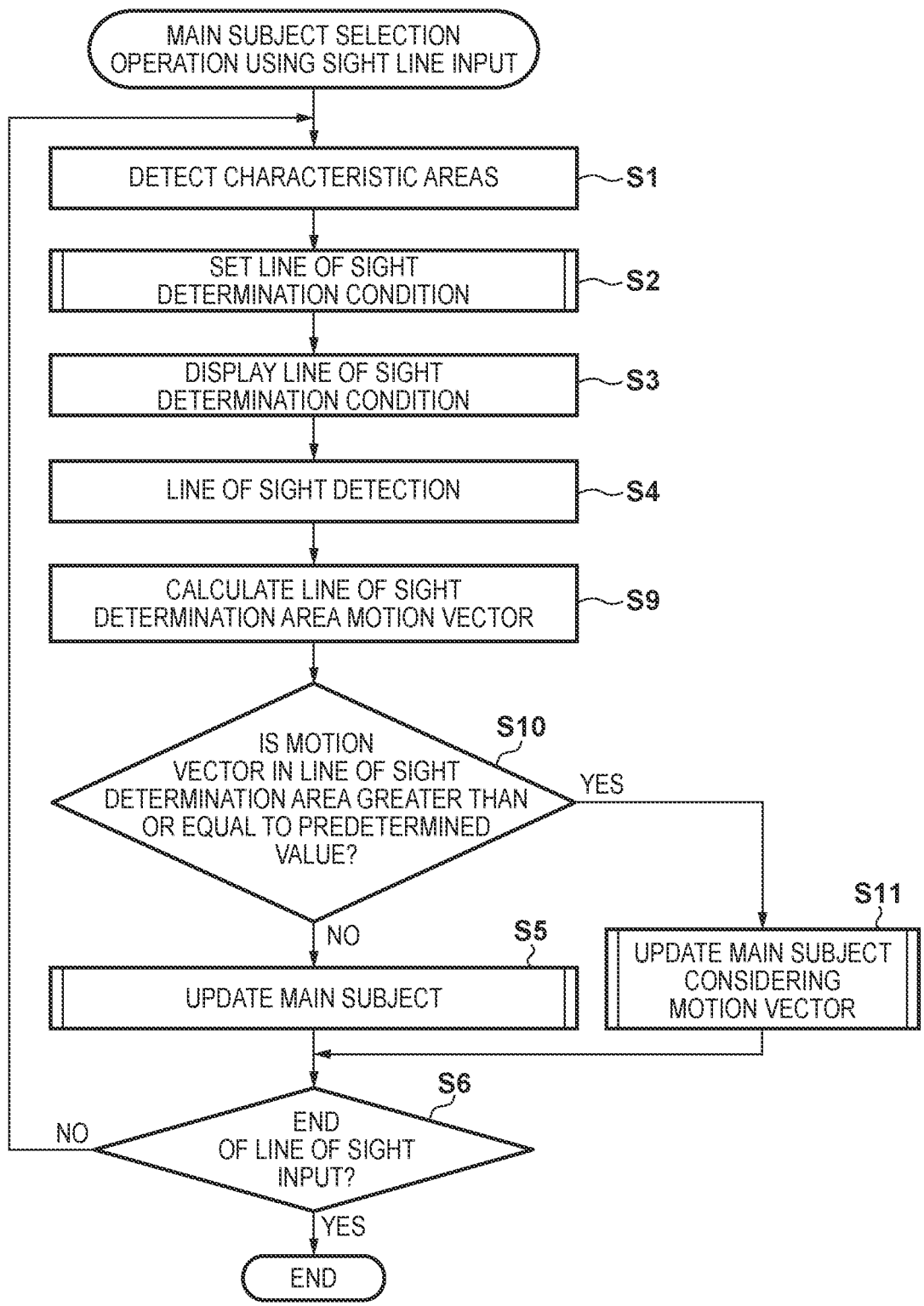
FIG. 12 is a flowchart relating to a selection operation of a main subject according to a fourth embodiment.

FIG. 12 is a flowchart regarding the operation of selecting a main subject by the LoS input in the present embodiment. In FIG. 12, the steps in common with the first embodiment are given the same reference numerals as those in FIG. 6, and redundant descriptions will be omitted. The present embodiment differs from the first embodiment in that steps S9 to S11 are added. In the following, a description will be given regarding steps S9 to S11, which are features of the present embodiment.

In step S9, the system control circuit 50 calculates a motion vector with respect to each of the determination areas. For example, the system control circuit 50 acquires time series data of the center position of each determination area, and sets, as the components of the motion vector, the movement amount and movement direction of the center position between frames that are obtained by performing averaging over a predetermined plurality of frames. Note that the motion vector may be obtained using another method. Also, the motion vector may be obtained with respect to a corresponding characteristic area instead of the determination area. Also, information other than the motion vector may be acquired as long as the information represents the motion, in the in-plane direction, of the characteristic area (subject).

In step S10, the system control circuit 50 determines that, with respect to a determination area whose motion vector has a size that is greater than or equal to a predetermined value, the subject has moved, and executes the processing in step S11. On the other hand, the system control circuit 50 determines that, with respect to a determination area whose motion vector has a size that is less than the predetermined value, the subject has not moved, and executes the processing in step S5. In this way, the system control circuit 50 performs update processing that is different between a determination area corresponding to a moving subject and a determination area corresponding to a subject that is not moving.

The update processing of the main subject considering the motion vector that is performed in step S11 will be described using the flowchart shown in FIG. 13. In FIG. 13, the steps in common with the first embodiment are given the same reference numerals as those in FIG. 10, and redundant descriptions will be omitted. The present embodiment differs from the first embodiment in that steps S59 to S61 are added. In the following, a description will be given regarding steps S59 to S61, which are features of the present embodiment. In the present embodiment, the threshold value of the gaze time is relaxed in step S59, instead, the determination of the main subject is performed by evaluating the matching degree between the motion vector of the determination area and the motion vector of the line of sight, in step S61.

In step S59, the system control circuit 50 determines whether or not the gaze time of the determination area selected in step S52 is greater than or equal to a second threshold value, if it is determined to be greater than or equal to the second threshold value, advances the processing to step S60, and if not, returns the processing to step S51. Here, the second threshold value is smaller than the first threshold value used in the first embodiment. When the subject is moving, line of sight tracking is delayed, and updating of the determination area is delayed, and therefore the gaze position is easily departed from the determination area. Therefore, a small threshold value of the gaze time is set such that the main subject can be easily selected.

In step S60, the system control circuit 50 obtains the motion vector of the line of sight (the gazed point). The motion vector of the line of sight is a motion vector in the in-plane direction similarly to the motion vector of the determination area. The motion vector of the line of sight can be obtained by handling the time series data of the position of the gazed point acquired in step S4 in FIG. 12, similarly to the center position of the viewpoint determination area. Note that the positions, of the positions of the gazed point, that largely differ from the center position of the viewpoint determination area at the same or close timing may be regarded as the unintended gazed point, and removed from the calculation of the motion vector.

In step S61, the system control circuit 50 determines whether or not the matching degree between the motion vector of the determination area obtained in step S9 and the motion vector of the line of sight obtained in step S60 satisfies the condition. For example, the system control circuit 50, after converting the motion vectors to unit vectors, calculates an inner product, and can determine that the matching degree in direction is high (or matched) if the value of the inner product is greater than or equal to a threshold value that is close to 1. Also, the system control circuit 50 can determine that the matching degree in the movement amount is high (or matched) if the difference in size between the motion vectors is less than a threshold value that is close to 0. If it is determined that the matching degree is high (or matched) in both of the direction and the movement amount, the system control circuit 50 determines that the matching degree between the motion vectors is high (or matched). Note that the matching degree between the motion vectors may be determined using another method. The system control circuit 50, if it is determined that the motion vector of the determination area matches the motion vector of the line of sight, advances the processing to step S56, and if not, returns the processing to step S51.

In step S56, the system control circuit 50 selects a subject (characteristic area) corresponding to the selected determination area as the main subject.

Also, the determination area regarding a subject (characteristic area) that is determined to be moving in step S9 in FIG. 12 may be expanded. FIGS. 14A and 14B show an exemplary expansion of the determination area. Here, it is assumed that the subject is moving, in a plane, in a direction indicated by the arrow. In the prior frame, a determination area 401 is set. Also, if the expansion is not performed, a determination area 402 is set in the current frame.

FIG. 14A shows an exemplary expansion of the determination area in which the tracking delay of the line of sight of the user is considered. If the line of sight tracking is delayed relative to the motion of the subject, it is possible that the gazed point in the current frame is positioned between the determination areas 401 and 402. Therefore, a determination area 403 that is obtained by expanding the determination area 402 of the current frame so as to include the determination area 401 is set. With this, even if the line of sight tracking is delayed, stable selection of the main subject can be realized.

FIG. 14B shows an exemplary expansion of the determination area in which delay in updating the determination area is considered in addition to the tracking delay of the line of sight of the user. The determination area is set to a detected characteristic area, and therefore the determination area is set at a timing delayed from the timing at which a live view image is displayed in the display device 28. Therefore, if the subject is a moving body, it is highly possible that the user gazes at the subject after movement, before the setting of the determination area is updated.

Therefore, the motion of the subject is estimated, and the determination area can be moved to a position corresponding to the estimated position. In FIG. 14B, the expanded determination area 403 shown in FIG. 14A is moved to a determination area 404 based on an estimated position of the subject after movement. As a result of updating the setting of the determination area based on the estimated movement position of the subject in this way, the main subject can be stably selected by the line of sight. Note that, in FIG. 14B, the characteristic area (subject) with respect to which the determination area 402 is set is present in a further moved position in a frame at which the determination area 404 is set.

As shown in FIGS. 14A and 14B, when the determination area is expanded, it is possible that an overlap with another determination area occurs. When a position of a gazed point is included in an overlapping area of the determination area, it is difficult to specify which of the viewpoint determination areas the user gazes at. However, in the present embodiment, the motion vectors of the determination areas are considered, and therefore, even if the position of the gazed point is included in the overlapping area, which of the viewpoint determination areas the user gazes at can be specified.

As described above, according to the present embodiment, the line of sight determination condition is set considering the motion vector of the characteristic area (subject). Therefore, even if the line of sight tracking made by the user is delayed relative to a moving subject, or the updating of the determination area is delayed relative to the image display, the selection of the main subject using the line of sight is possible.

Fifth Embodiment

Next, a fifth embodiment of the present invention will be described. The present embodiment relates to a method of notifying the user of the threshold value of the gaze time and the current gaze time. In the embodiments described above, an example in which the user is notified of the size and position of the determination area, of the line of sight determination condition, has been described (FIGS. 5A and 5B and FIGS. 9A and 9B). However, the usability can be improved by notifying, when realizing the selection of the main subject using the line of sight, the user of the threshold values of the gaze time, which indicate selection easiness of each subject, and the remaining gaze time that is needed until the subject is selected as the main subject.

FIGS. 15A to 15D show an example of the method of notifying the user of the subject at which the user currently gazes, and the remaining gaze time that is needed until the subject is selected as the main subject. Here, the change in display is shown when the main subject is switched from a subject to another subject using the line of sight.

Here, it is assumed that there are three people, namely persons A to C, in the shooting range, and the face areas of the respective persons are detected as the characteristic areas. Also, a determination area is set to each characteristic area, and the size and position of the determination area are indicated by a frame-like indicator. In the present embodiment, gaze indicators 501 to 503 are displayed that indicate the set threshold values of the gaze time, and the remaining gaze times that are needed until the respective subjects are selected as the main subject, in association with the respective determination areas. Note that, here, the gaze indicator is associated with a determination area by arranging the gaze indicator in the vicinity of the indicator of the determination area, but another mode may be used.

The gaze indicators 501 to 503 are each shaped as an inverse triangle, and the size thereof indicates the size of the threshold value of the gaze time. Here, the set threshold values of the gaze time are the same, and therefore the sizes of the gaze indicators 501 to 503 are the same. Also, the gaze indicator 503 whose entirety is filled in black indicates that the subject is a subject selected as the main subject. The gaze indicator corresponding to the gazed determination area is gradually filled in black as the gaze time increases. In the following, in order to make the description and understanding easy, gazing at the determination area set in the face area of the person A is treated as the gazing at the person A. The same applies to the persons B and C.

Figures 15A, 15B, 15C:
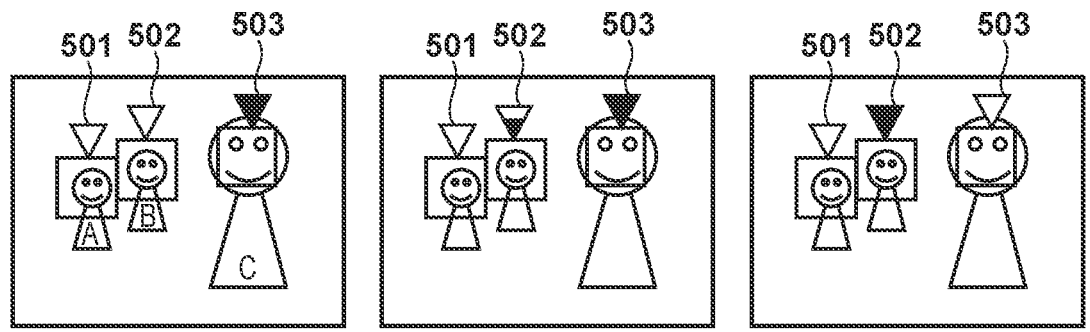
FIGS. 15A to 15D are diagrams illustrating an example of an indicator indicating a threshold value of a gaze time and a gaze time according to a fifth embodiment.

In FIG. 15A, the entirety of the gaze indicator 503 is filled in black, and the person C is selected as the main subject. Also, the gaze indicators 501 and 502 are not at all filled in black, which indicates that the gaze times regarding the persons A and B are 0.

Assume that the user shifts the line of sight from the person C to the person B in a state illustrated in FIG. 15A. The system control circuit 50, upon performing processing in step S54 in FIG. 10 or 13, increases the filling amount of the gaze indicator corresponding to the determination area that is being selected. With this, the display of the gaze indicator 502 regarding the person B changes as shown in FIG. 15B. The ratio of filling per instance can be 1/(threshold value of the gaze time (frame count)), where the height of the indicator is defined as 1. At the point in time illustrated in FIG. 15B, the gaze time regarding the person B has not reached the threshold value, and therefore the main subject remains to be person C, and the state of the gaze indicator 503 has not changed. Also, the person A is not gazed at, and therefore the state of the gaze indicator 504 has not changed.

If the user continues to gaze at the person B thereafter, and the gaze time reaches the threshold value, the selected main subject is changed from the person C to the person B. At this point in time, the gaze indicator 502 is completely filled, and the filling of the gaze indicator 503 is reset, as shown in FIG. 15C. The person A is not gazed at, and therefore the state of the gaze indicator 504 has not changed.

In this way, as a result of displaying the threshold value of the gaze time and the current gaze time using the gaze indicator, the user can be notified of whether or not gazing is performed correctly, the gaze time that is needed for selecting the main subject, and the like.

Figure 15D:
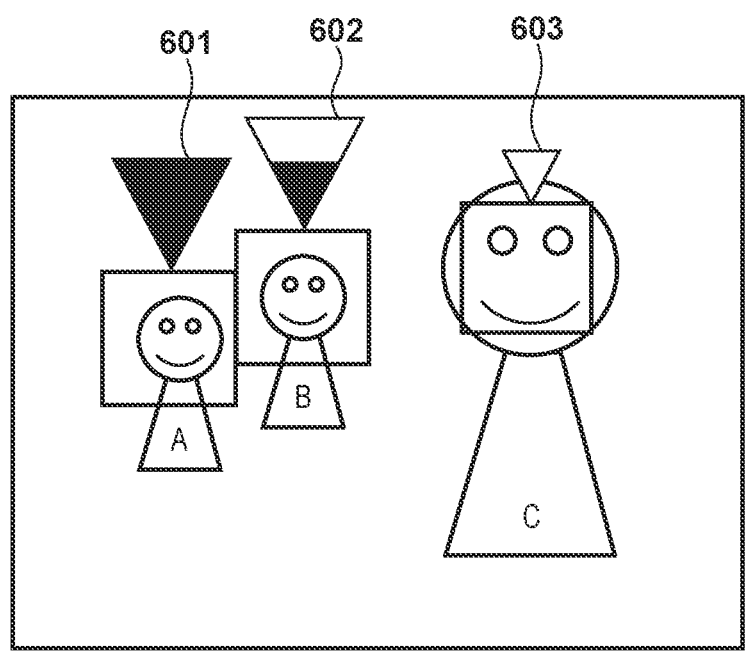

Note that if the threshold values of the gaze time differ between the viewpoint determination areas, the size of the gaze indicator can be changed, as shown in FIG. 15D, for example. In FIG. 15D, the fact that the threshold value of the gaze time set to the viewpoint determination area corresponding to the person C is smaller than the threshold values of the gaze time set to the viewpoint determination areas corresponding to the persons A and B is indicated by the sizes of the gaze indicators 601 to 603.

Here, the size of the threshold value of the gaze time is indicated by the size of the gaze indicator. However, even if the gaze indicators of the same size are used regardless of the size of the threshold value of the gaze time, the user can grasp whether the threshold value of the gaze time is large or small by changing the speed at which the gaze indicator is being filled.

Note that the method of notifying the user of the threshold value of the gaze time and the remaining gaze time that is needed to be selected as the main subject (or current accumulated gaze time) is not limited to the example shown in FIGS. 15A to 15D. For example, the thickness, size, or color of the frame of the determination area may also be used as the gaze indicator. Also, the configuration may also be such that how many more frames of gazing need to be performed for causing switching is displayed by number shown above the frame of the determination area.

Note that if an area regarding which focus detection is not possible is present such as a case of using dedicated focus detection pixels as shown in FIG. 2B, the user may be notified of the fact that focus detection is not possible by not displaying the gaze indicator regarding a characteristic area that includes an area regarding which focus detection is not possible. Also, the user may also be notified of whether or not the characteristic area is a characteristic area regarding which focus detection is possible by displaying, with respect to a characteristic area regarding which focus detection is possible, an indicator of the determination area corresponding to the characteristic area, and with respect to a characteristic area regarding which focus detection is not possible, an indicator of the characteristic area.

Note that when a menu selection area regarding which the LoS input is used is present below a screen or on both sides of the screen, the configuration may also be such that selection of the main subject using the LoS input is not performed in the vicinity of the menu selection area in order to avoid erroneous detection. In this case as well, the user may be notified of the characteristic area that cannot be selected as the main subject by not displaying the gaze indicator.

Also, a configuration may also be adopted in which, with respect to a characteristic area regarding which rearrangement of the determination area is not possible in step S255 in FIG. 8B in the first embodiment, only an indicator of the characteristic area is displayed, and the indicator of the determination area and the gaze indicator are not displayed. With this, the user can grasp a subject that cannot be selected as the main subject using the line of sight.

Note that, a configuration may also be adopted in which, if turning on of the SW1 62 is detected in a state in which a main subject is selected, the user is notified of the fact that tracking of the main subject is started by erasing the gaze indicators and displaying the indicator of the determination area regarding only the main subject.

As described above, according to the present embodiment, the user is notified of the set threshold value of the gaze time and the remaining gaze time that is needed to be selected as the main subject. Therefore, the usability in selecting the main subject using the line of sight can be improved.

Other Embodiments

Note that in the embodiments described above, a configuration has been described in which the gaze time is handled using one frame (frame period) of the live view image as the unit. However, the gaze time may be handled using a specific time (e.g., a millisecond) as the unit.

Note that in the embodiments described above, a configuration has been described in which a face area is detected as the characteristic area. However, the image processing circuit 24 may only perform detection of areas serving as candidates of a characteristic area, instead of detecting a specific characteristic area such as a face.

Note that in the embodiments described above, a configuration has been described in which the shapes of the subject detection area and the determination area are squares, but the shape may be other shapes such as a rectangle and a circle.

Note that in the embodiments described above, a configuration has been described in which the main subject at which the user gazes is determined based on the gaze time. However, other configuration may be adopted as long as the main subject at which the user gazes can be determined from the determination area and the detected position of the gazed point.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-148926, filed on Aug. 14, 2019, which is hereby incorporated by reference herein in its entirety.

What is claimed is:

1. An electronic device comprising:
at least one memory and at least one processor which function as:
a line of sight detection unit configured to detect a position of a gazed point on a screen of a display device based on a line of sight of a user;
an area detection unit configured to detect at least one object area from an image displayed on the display device;
a setting unit configured to set a determination area to each object area; and
a selection unit configured to select an object area corresponding to a determination area including the position of the gazed point,
wherein:
the setting unit sets a size of the determination area depending on a size of a respective object area, and, for an object area whose size is less than a predetermined lower limit value, sets the determination area having a predetermined size being larger than the size of the object area.

2. The electronic device according to claim 1, wherein the setting unit determines the size of the determination area based on the shortest distance between the object areas.

3. The electronic device according to claim 2, wherein the setting unit, if the size based on the shortest distance is less than the lower limit value, set the size of the determination area to the lower limit value.

4. The electronic device according to claim 1, wherein the at least one memory and the at least one processor further function as:
an acquiring unit configured to acquire distance information of object areas,
wherein:
the setting unit, with respect to an object area whose difference in distance from an object area that is being selected by the selection unit is greater than or equal to a threshold value, does not set the determination area, or sets the determination area having the size at the lower limit value.

5. The electronic device according to claim 1, wherein the setting unit increases the size of the determination area with respect to an object area that is determined to be moving relative to that with respect to an object area that is not determined to be moving.

6. The electronic device according to claim 5, wherein the setting unit increases the size of the determination area with respect to an object area that is determined to be moving in a direction in which the object area moves.

7. The electronic device according to claim 1,
wherein the selection unit selects an object area corresponding to a determination area whose period of time in which the position of the gazed point is included is greater than or equal to a threshold value, and
the at least one memory and the at least one processor further function as a display control unit configured to control the display device so as to display an indicator indicating the size of the threshold value and a gaze time needed until being selected for each object area.

8. The electronic device according to claim 7, wherein the dispay control unit controls the display device not to display the indicator with respect to an object area that cannot be selected using a line of sight.

9. The electronic device according to claim 1, wherein the at least one memory and the at least one processor further function as a control unit configured to perform at least one of exposure control, focus detection, and image processing on a captured image, using information regarding the object area selected by the selection unit.

10. An electronic device comprising:
at least one memory and at least one processor which function as:
a line of sight detection unit configured to detect a position of a gazed point on a screen of a display device based on a line of sight of a user;
an area detection unit configured to detect at least one object area from an image displayed on the display device;
a setting unit configured to set a determination area to each object area; and
a selection unit configured to select an object area corresponding to a determination area including the position of the gazed point,
wherein:
the setting unit sets the determination area having a size that is greater than or equal to a predetermined lower limit value; and
the setting unit, if an overlap occurs between the determination areas if the determination areas are set such that the center position is the same between each object area and the corresponding determination area, shifts the center positions of the determination areas from the respective center positions of the object areas.

11. An electronic device comprising:
at least one memory and at least one processor which function as:
a line of sight detection unit configured to detect a position of a gazed point on a screen of a display device based on a line of sight of a user;
an area detection unit configured to detect at least one object area from an image displayed on the display device;
a setting unit configured to set a determination area to each object area; and
a selection unit configured to select an object area corresponding to a determination area including the position of the gazed point,
wherein:
the setting unit sets the determination area having a size that is greater than or equal to a predetermined lower limit value; and
the selection unit selects an object area corresponding to a determination area whose period of time in which the position of the gazed point is included is greater than or equal to a threshold value.

12. The electronic device according to claim 11,
wherein the area detection unit detects an area relating to a specific object as the object area, and
the setting unit changes at least one of the size of the determination area and the threshold value in accordance with a type or a motion speed of the specific object.

13. The electronic device according to claim 12, wherein the setting unit sets the determination area only to an object area, of the object areas, that satisfies a predetermined condition.

14. The electronic device according to claim 12, wherein, if the motion of the object is greater than or equal to a threshold value, the selection unit performs selection using the position of the gazed point that the line of sight detection unit detected in the past.

15. The electronic device according to claim 11,
wherein the area detection unit detects an area relating to a specific object as the object area, and
the setting unit changes the position of the determination area relative to the object area in accordance with a type of the specific object.

16. The electronic device according to claim 15, wherein the setting unit sets the determination area to a part, of the object area, which is highly possible to be gazed at.

17. The electronic device according to claim 11, wherein the at least one memory and the at least one processor further function as:
an acquiring unit configured to acquire distance information of object areas,
wherein:
the selection unit selects an object area corresponding to a determination area whose period of time in which the position of the gazed point is included is greater than or equal to a threshold value, and
the threshold value with respect to an object area whose difference in distance from an object area that is being selected by the selection unit is greater than or equal to a threshold value is larger than the threshold value with respect to an object area whose difference in distance from an object area that is being selected by the selection unit is not greater than or equal to a threshold value.

18. The electronic device according to claim 11,
wherein the selection unit selects an object area corresponding to a determination area whose period of time in which the position of the gazed point is included is greater than or equal to a threshold value,
the threshold value with respect to an object area that is determined to be moving is smaller than the threshold value with respect to an object area that is determined to be not moving, and
the selection unit selects, with respect to an object area that is determined to be moving, if the period of time in which the position of the gazed point is included is greater than or equal to a threshold value, and the degree of matching between a motion vector regarding the object area and a motion vector regarding the position of the gazed point satisfies a condition, the object area.

19. A control method of an electronic device comprising:
detecting a position of a gazed point on a screen of a display device based on a line of sight of a user;

detecting at least one object area from an image displayed on the display device;

setting a determination area to each object area; and selecting an object area corresponding to a determination area including the position of the gazed point, wherein, in the setting, a size of the determination area is determined based on a size of a respective object area, and for an object area whose size is less than a predetermined lower limit value, a predetermined size being larger than the size of the object area is determined as the size of the determination area.

20. A non-transitory computer-readable medium storing a program for causing at least one processor included in an electronic device to function as:

a line of sight detection unit configured to detect a position of a gazed point on a screen of a dispay device based on a line of sight of a user;

an area detection unit configured to detect at least one object area from an image displayed on the display device;

a setting unit configured to set a determination area to each object area; and a selection unit configured to select an object area corresponding to a determination area including the position of the gazed point, wherein:

the setting unit sets a size of the determination area depending on a size of a respective object area, and, for an object area whose size is less than a predetermined lower limit value, sets the determination area having a predetermined size being larger than the size of the object area.

* * * * *